US012687824B2

(12) United States Patent (10) Patent No.: US 12,687,824 B2
Mullen et al. (45) Date of Patent: Jul. 21, 2026

(54) MANUFACTURING CLOUD SYSTEM

(71) Applicant: Rockwell Automation Technologies, Inc., Mayfield Heights, OH (US)

(72) Inventors: Adam S Mullen, Detroit, MI (US); Anthony J. Murphy, Long Beach, CA (US); Ara Surenian, Arlington Heights, IL (US); Devin Burke, Evansville, IL (US); Manu Ravichandran, Austin, TX (US); Michael Hart, Goodrich, MI (US); Nathan Pieri, Melbourne Beach, FL (US); Olusola O. Oduntan, Novi, MI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 282 days.

(21) Appl. No.: 18/666,207

(22) Filed: May 16, 2024

(65) Prior Publication Data

US 2025/0355408 A1 Nov. 20, 2025

(51) Int. Cl.
G05B 13/02 (2006.01)
(52) U.S. Cl.
CPC .................................. G05B 13/028 (2013.01)
(58) Field of Classification Search
CPC ...... G05B 13/028; G06N 3/094; G06N 3/047; G06N 3/0475; G06N 3/0455; H04L 67/1097; G06F 40/20; G06F 40/30; G06F 40/35; G06Q 10/0631; G06Q 10/06312; G06Q 10/0639; G06Q 50/04
USPC ........................................ 700/47
See application file for complete search history.

(56) References Cited

U.S. PATENT DOCUMENTS

| | | | |
|---|---|---|---|
| 5,283,745 | A | 2/1994 | Tanaka et al. |
| 5,630,070 | A | 5/1997 | Dietrich et al. |
| 5,787,283 | A | 7/1998 | Chin et al. |
| 5,854,746 | A | 12/1998 | Yamamoto et al. |
| 6,094,603 | A | 7/2000 | Ishii |
| 7,058,587 | B1 | 6/2006 | Horne |

(Continued)

FOREIGN PATENT DOCUMENTS

EP 4 009 254 A1 6/2022

OTHER PUBLICATIONS

Software-as-a-service (SaaS): perspectives and challenges, By: Tsai WeiTek, May 2014, Total pp. 15 (Year: 2014).*

(Continued)

*Primary Examiner* — Jigneshkumar C Patel
(74) *Attorney, Agent, or Firm* — Amin, Turocy & Watson, LLP

(57) ABSTRACT

A multi-tenant, cloud-based Software-as-a-Service (SaaS) manufacturing cloud system offers a variety of industrial applications to end customers, including but not limited to MES, ERP, quality management, supply chain management, and customer relationship management (CRM). The system includes extensibility tools that allows industrial customers to customize databases, data collection templates, reporting fields, and other features of their consumed services, eliminating the need for these features to be customized by an administrator of the cloud system. Some embodiments of the manufacturing cloud system can also leverage generative artificial intelligence (AI) in connection with executing its supported services.

20 Claims, 17 Drawing Sheets

(56) References Cited

U.S. PATENT DOCUMENTS

| | | | |
|---|---|---|---|
| 7,216,086 B1 | 5/2007 | Grosvenor et al. | |
| 7,536,311 B1 | 5/2009 | Kralik et al. | |
| 8,428,760 B2 | 4/2013 | Fontenot | |
| 8,494,971 B2 | 7/2013 | Hama | |
| 8,914,300 B2 | 12/2014 | Sustaeta et al. | |
| 9,253,253 B1 | 2/2016 | Bhattacharyya et al. | |
| 9,412,137 B2 | 8/2016 | Mclaughlin et al. | |
| 9,438,648 B2 | 9/2016 | Asenjo et al. | |
| 9,805,330 B2 | 10/2017 | Surendra et al. | |
| 9,965,339 B2 | 5/2018 | Bryan et al. | |
| 10,402,763 B2 | 9/2019 | Chong et al. | |
| 10,489,850 B2 | 11/2019 | Smits et al. | |
| 10,496,061 B2 | 12/2019 | Strohmenger et al. | |
| 10,872,309 B2 | 12/2020 | Surendra et al. | |
| 11,036,682 B2 | 6/2021 | Duncan-Wilson et al. | |
| 11,093,884 B2 | 8/2021 | Devarakonda et al. | |
| 11,238,389 B2 | 2/2022 | Srinivasan | |
| 11,429,912 B1 | 8/2022 | Le et al. | |
| 11,513,477 B2 | 11/2022 | Strohmenger et al. | |
| 11,694,142 B2 | 7/2023 | Devarakonda et al. | |
| 11,860,613 B2 | 1/2024 | Maury et al. | |
| 12,212,654 B2 | 1/2025 | Das et al. | |
| 12,271,825 B2 | 4/2025 | Luzin | |
| 2002/0082893 A1 | 6/2002 | Barts et al. | |
| 2002/0138316 A1 | 9/2002 | Katz et al. | |
| 2002/0165747 A1 | 11/2002 | Shriver et al. | |
| 2003/0033179 A1 | 2/2003 | Katz et al. | |
| 2003/0050817 A1 | 3/2003 | Cargille et al. | |
| 2005/0131779 A1 | 6/2005 | Kitamura et al. | |
| 2006/0052894 A1 | 3/2006 | Ueno et al. | |
| 2007/0150379 A1 | 6/2007 | Vernaci et al. | |
| 2007/0203810 A1 | 8/2007 | Grichnik | |
| 2009/0048889 A1 | 2/2009 | Arinez et al. | |
| 2009/0138321 A1 | 5/2009 | Henby et al. | |
| 2009/0204245 A1 | 8/2009 | Sustaeta et al. | |
| 2009/0204267 A1 | 8/2009 | Sustaeta et al. | |
| 2011/0125543 A1 | 5/2011 | Saito et al. | |
| 2011/0288668 A1 | 11/2011 | Barker et al. | |
| 2013/0212061 A1 | 8/2013 | Chitiveli | |
| 2014/0031965 A1 | 1/2014 | Sun et al. | |
| 2014/0047107 A1 | 2/2014 | Maturana et al. | |
| 2014/0095249 A1 | 4/2014 | Tarakad et al. | |
| 2014/0280065 A1 | 9/2014 | Cronin et al. | |
| 2014/0337086 A1 | 11/2014 | Asenjo et al. | |
| 2014/0337277 A1 | 11/2014 | Asenjo et al. | |
| 2015/0347951 A1 | 12/2015 | Tamblyn et al. | |
| 2016/0274552 A1* | 9/2016 | Strohmenger ......... | G06Q 10/06 |
| 2016/0274558 A1 | 9/2016 | Strohmenger et al. | |
| 2017/0098186 A1 | 4/2017 | Song et al. | |
| 2017/0207629 A1 | 7/2017 | Seki et al. | |
| 2018/0205803 A1 | 7/2018 | Asenjo et al. | |
| 2018/0284749 A1 | 10/2018 | Cella et al. | |
| 2018/0357334 A1 | 12/2018 | Chao et al. | |
| 2019/0204101 A1 | 7/2019 | Macrae et al. | |
| 2019/0370352 A1 | 12/2019 | Duncan-Wilson et al. | |
| 2020/0060053 A1 | 2/2020 | Shimizu et al. | |
| 2020/0143313 A1 | 5/2020 | Ohlsson et al. | |
| 2020/0209811 A1 | 7/2020 | Devarakonda et al. | |
| 2020/0210947 A1 | 7/2020 | Devarakonda et al. | |
| 2020/0272136 A1 | 8/2020 | Fujita et al. | |
| 2020/0387818 A1 | 12/2020 | Chan et al. | |
| 2021/0278825 A1 | 9/2021 | Wen et al. | |
| 2022/0019204 A1 | 1/2022 | Maury et al. | |
| 2022/0067622 A1 | 3/2022 | Devarakonda | |
| 2022/0374402 A1 | 11/2022 | Hawkins et al. | |
| 2023/0147668 A1* | 5/2023 | Penugonda ......... | G06F 11/0772 714/38.1 |
| 2023/0297089 A1 | 9/2023 | Jin et al. | |
| 2023/0316359 A1 | 10/2023 | Nair et al. | |
| 2023/0324858 A1 | 10/2023 | Oshima et al. | |
| 2023/0341823 A1 | 10/2023 | Osagawa | |
| 2023/0342392 A1 | 10/2023 | Mccarson | |
| 2023/0351322 A1 | 11/2023 | Sharma et al. | |
| 2023/0418524 A1 | 12/2023 | Darji et al. | |
| 2024/0095853 A1 | 3/2024 | Wollstadt et al. | |
| 2024/0163304 A1 | 5/2024 | Gupta | |
| 2024/0369989 A1 | 11/2024 | Wen et al. | |
| 2024/0385584 A1 | 11/2024 | Vanbrocklin et al. | |
| 2024/0386016 A1 | 11/2024 | Vanbrocklin et al. | |
| 2024/0386372 A1 | 11/2024 | Vanbrocklin et al. | |
| 2024/0386511 A1 | 11/2024 | Vanbrocklin et al. | |
| 2024/0393770 A1 | 11/2024 | Vanbrocklin et al. | |
| 2024/0394275 A1 | 11/2024 | Vanbrocklin et al. | |
| 2024/0394719 A1 | 11/2024 | Vanbrocklin et al. | |
| 2024/0394760 A1 | 11/2024 | Vanbrocklin et al. | |
| 2024/0394808 A1 | 11/2024 | Vanbrocklin et al. | |
| 2024/0403658 A1 | 12/2024 | Rigterink et al. | |
| 2024/0403776 A1 | 12/2024 | Krishna et al. | |
| 2025/0029854 A1 | 1/2025 | Oberoi et al. | |
| 2025/0037156 A1 | 1/2025 | Ng et al. | |
| 2025/0044762 A1 | 2/2025 | Sayyarrodsari et al. | |
| 2025/0173647 A1 | 5/2025 | Peterson | |
| 2025/0355408 A1 | 11/2025 | Mullen et al. | |
| 2025/0355424 A1 | 11/2025 | Murphy et al. | |
| 2025/0355784 A1* | 11/2025 | Tanniru ..................... | G06F 8/10 |
| 2025/0356300 A1 | 11/2025 | Murphy et al. | |

OTHER PUBLICATIONS

Investigating the use of an Artificial Intelligence Model in an ERP Cloud-Based System, By: Nikhitha Yathiraju, Total pp. 26 (Year: 2022).*

Non-Final Office Action received for U.S. Appl. No. 18/666,234 dated Aug. 13, 2025, 25 pages.

Non-Final Office Action received for U.S. Appl. No. 18/661,811 dated Aug. 22, 2025, 26 pages.

Stewart, Ben, "MES for Dummies", Wiley, Plex Systems, 2nd Special Edition, 2022, 65 pages.

Lemay, Patrick, "An Intro Cloud-Based Manufacturing Execution Systems", Process Execution, May 3, 2022, 8 pages.

"Rockwell Automation Presents: What's New in Software at Automation Fair this Year", Rockwell Automation, Automation.com, Oct. 25, 2023, 8 pages.

Extended European Search Report received for European Patent Application Serial No. 25175724.1 dated Sep. 24, 2025, 14 pages.

Jackson et al., "Generative Artificial Intelligence in Supply Chain and Operations Management: A Capability-based Framework for Analysis and Implementation", International Journal of Production Research, vol. 62, No. 17, Jan. 31, 2024, pp. 6120-6145.

Gaddala, Venkat Sharma, "Prompt Engineering in Supply Chain Enterprise Data", Iconic Research and Engineering Journals, IRE 1703797, vol. 6, Issue 3, Sep. 2022, pp. 213-224.

Jide-Jegede et al., "Harnessing Generative AI for Manufacturing Innovation: Applications and Opportunities", 2024 International Conference on Artificial Intelligence in Information and Communication (ICAIIC), 2024, 5 pages.

Beheshti et al., "ProcessGPT: Transforming Business Process Management with Generative Artificial Intelligence", 2023 IEEE International Conference on Web Services, arXiv:2306.01771v1, 2023, 9 pages.

Fosso Wamba et al., "Are Both Generative AI and ChatGPT Game Changers for 21st-Century Operations and Supply Chain Excellence?", International Journal of Production Economics, vol. 265, Nov. 2023.

Gurjar et al., "An Analytical Review on the Impact of Artificial Intelligence on the Business Industry: Applications, Trends, and Challenges", IEEE Engineering Management Review, IEEE, 2024, 24 pages.

Extended European Search Report received for European Patent Application Serial No. 25176090.6 dated Oct. 16, 2025, 10 pages.

European Search Report received for European Patent Application Serial No. 25176049.2 dated Oct. 17, 2025, 10 pgs.

Nguyen, et al. A Feature-Based Framework for Developing and Provisioning 8-12, 14, G06F40/20 Customizable Web Services, IEEE Transactions on Services Computing, IEEE, USA, vol. 9, No. 4, 2016.

Singh, et al. SuperArch: Optimal Architecture Design for Cloud Deployment. Proceedings of the 4th International Workshop on Distributed Infrastructure for the Common Good, ACMPub27, New York, NY, 2024.

(56) References Cited

OTHER PUBLICATIONS

Bhattacharjee, et al. CloudCAMP: Automating Cloud Services Deployment & Management. ARXIV.org, Cornell University Library, Ithaca, NY, 2019.

Final Office Action received for U.S. Appl. No. 18/661,811 dated Dec. 4, 2025, 30 pages.

Oracle Cloud Supply Planning-Production Scheduling Solution Brief, Oracle, 2021, 5 pages.

"Oracle Production Scheduling-Implementation Guide Release 12.2", Oracle, Sep. 2013, 384 pages.

Non-Final office action received for U.S. Appl. No. 18/661,811 dated Apr. 8, 2026, 26 pages.

Final office action received for U.S. Appl. No. 18/666,234 dated Mar. 2, 2026, 29 pages.

Non-Final Office Action received for U.S. Appl. No. 18/666,226 dated May 18, 2026, 79 pages.

* cited by examiner

FIG. 4

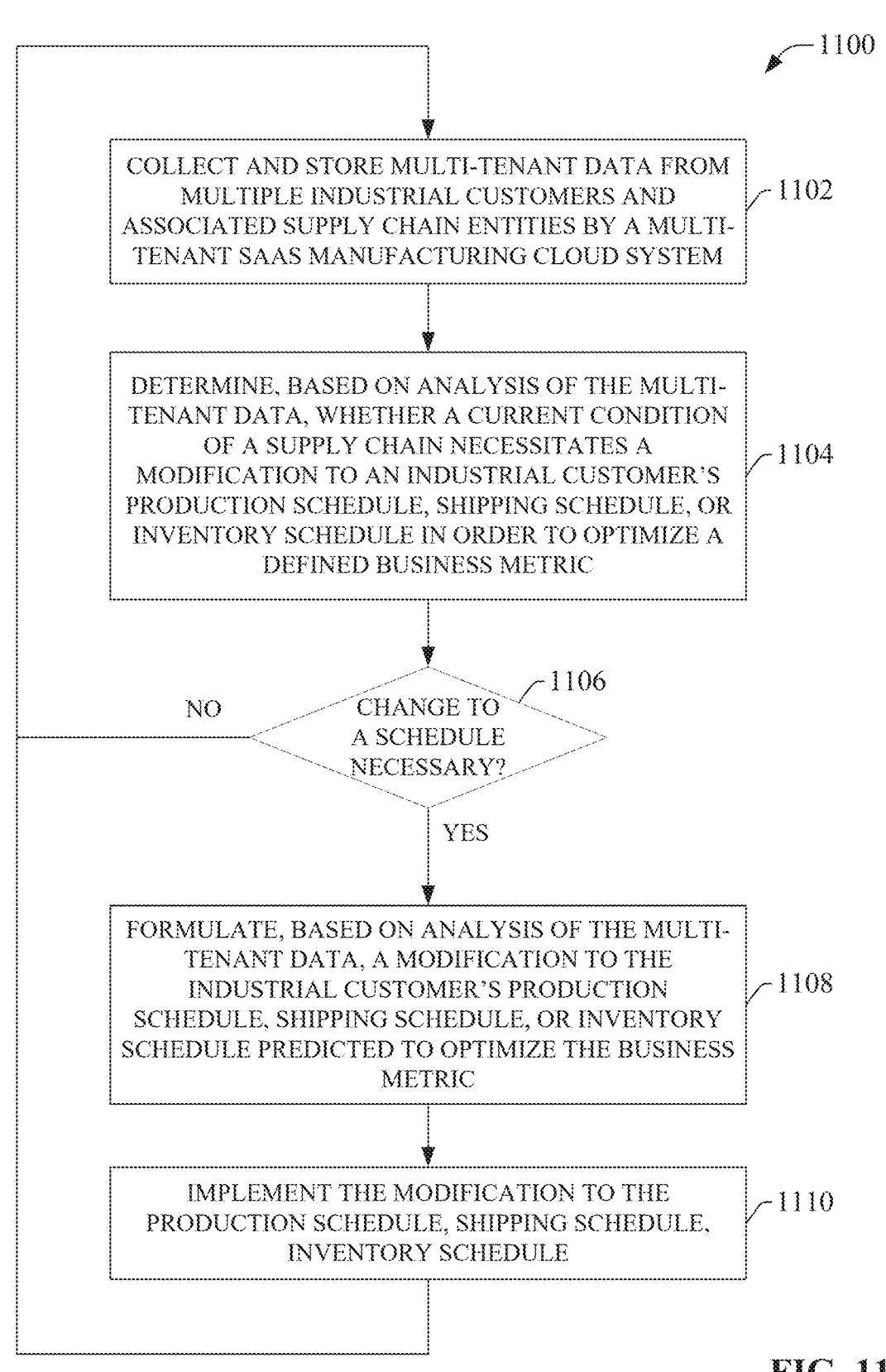

1100

COLLECT AND STORE MULTI-TENANT DATA FROM MULTIPLE INDUSTRIAL CUSTOMERS AND ASSOCIATED SUPPLY CHAIN ENTITIES BY A MULTI-TENANT SAAS MANUFACTURING CLOUD SYSTEM ⸺1102

DETERMINE, BASED ON ANALYSIS OF THE MULTI-TENANT DATA, WHETHER A CURRENT CONDITION OF A SUPPLY CHAIN NECESSITATES A MODIFICATION TO AN INDUSTRIAL CUSTOMER'S PRODUCTION SCHEDULE, SHIPPING SCHEDULE, OR INVENTORY SCHEDULE IN ORDER TO OPTIMIZE A DEFINED BUSINESS METRIC ⸺1104

NO ⟵ CHANGE TO A SCHEDULE NECESSARY? ⸺1106

YES

FORMULATE, BASED ON ANALYSIS OF THE MULTI-TENANT DATA, A MODIFICATION TO THE INDUSTRIAL CUSTOMER'S PRODUCTION SCHEDULE, SHIPPING SCHEDULE, OR INVENTORY SCHEDULE PREDICTED TO OPTIMIZE THE BUSINESS METRIC ⸺1108

IMPLEMENT THE MODIFICATION TO THE PRODUCTION SCHEDULE, SHIPPING SCHEDULE, INVENTORY SCHEDULE ⸺1110

FIG. 11

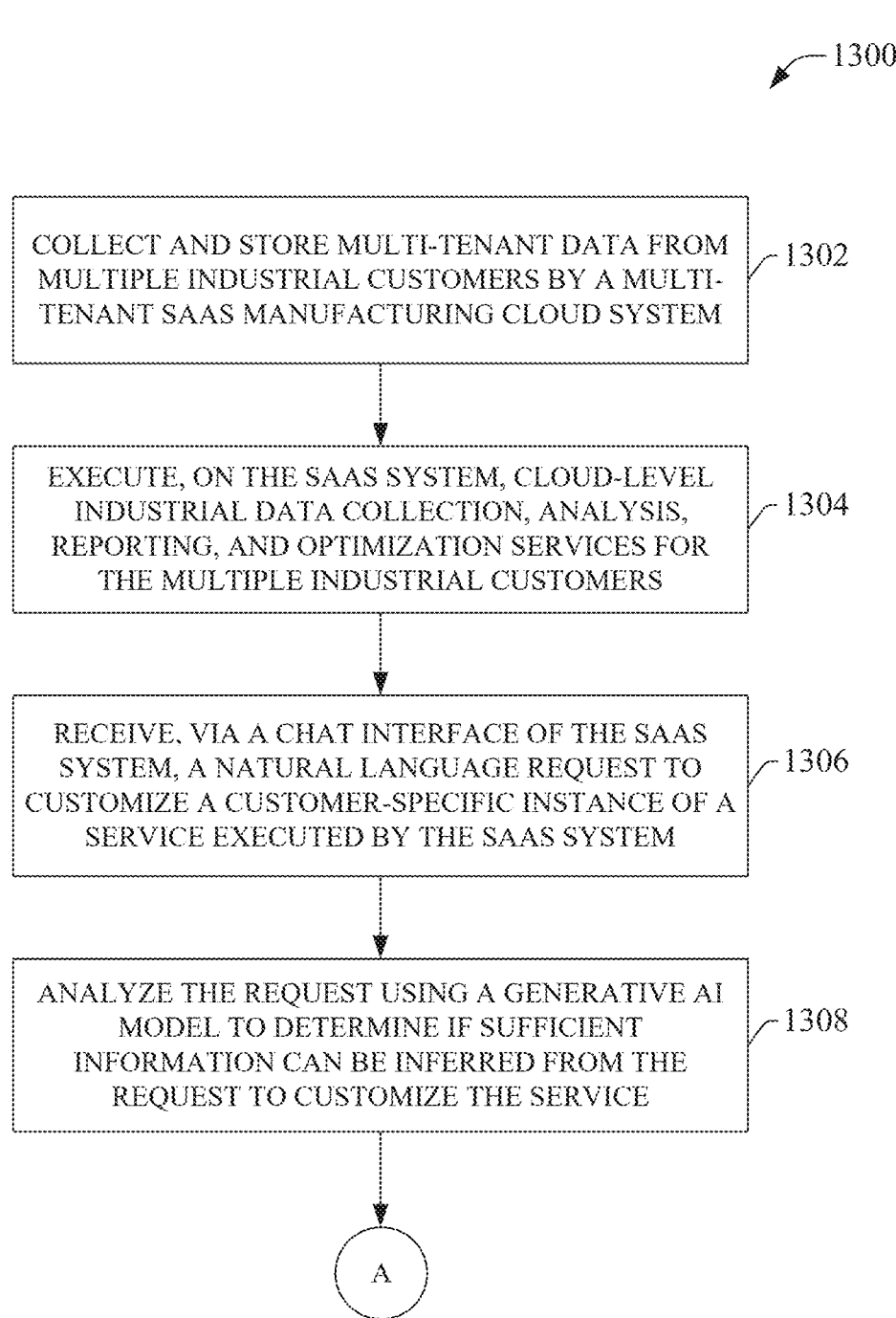

1300a

COLLECT AND STORE MULTI-TENANT DATA FROM MULTIPLE INDUSTRIAL CUSTOMERS BY A MULTI-TENANT SAAS MANUFACTURING CLOUD SYSTEM — 1302

EXECUTE, ON THE SAAS SYSTEM, CLOUD-LEVEL INDUSTRIAL DATA COLLECTION, ANALYSIS, REPORTING, AND OPTIMIZATION SERVICES FOR THE MULTIPLE INDUSTRIAL CUSTOMERS — 1304

RECEIVE, VIA A CHAT INTERFACE OF THE SAAS SYSTEM, A NATURAL LANGUAGE REQUEST TO CUSTOMIZE A CUSTOMER-SPECIFIC INSTANCE OF A SERVICE EXECUTED BY THE SAAS SYSTEM — 1306

ANALYZE THE REQUEST USING A GENERATIVE AI MODEL TO DETERMINE IF SUFFICIENT INFORMATION CAN BE INFERRED FROM THE REQUEST TO CUSTOMIZE THE SERVICE — 1308

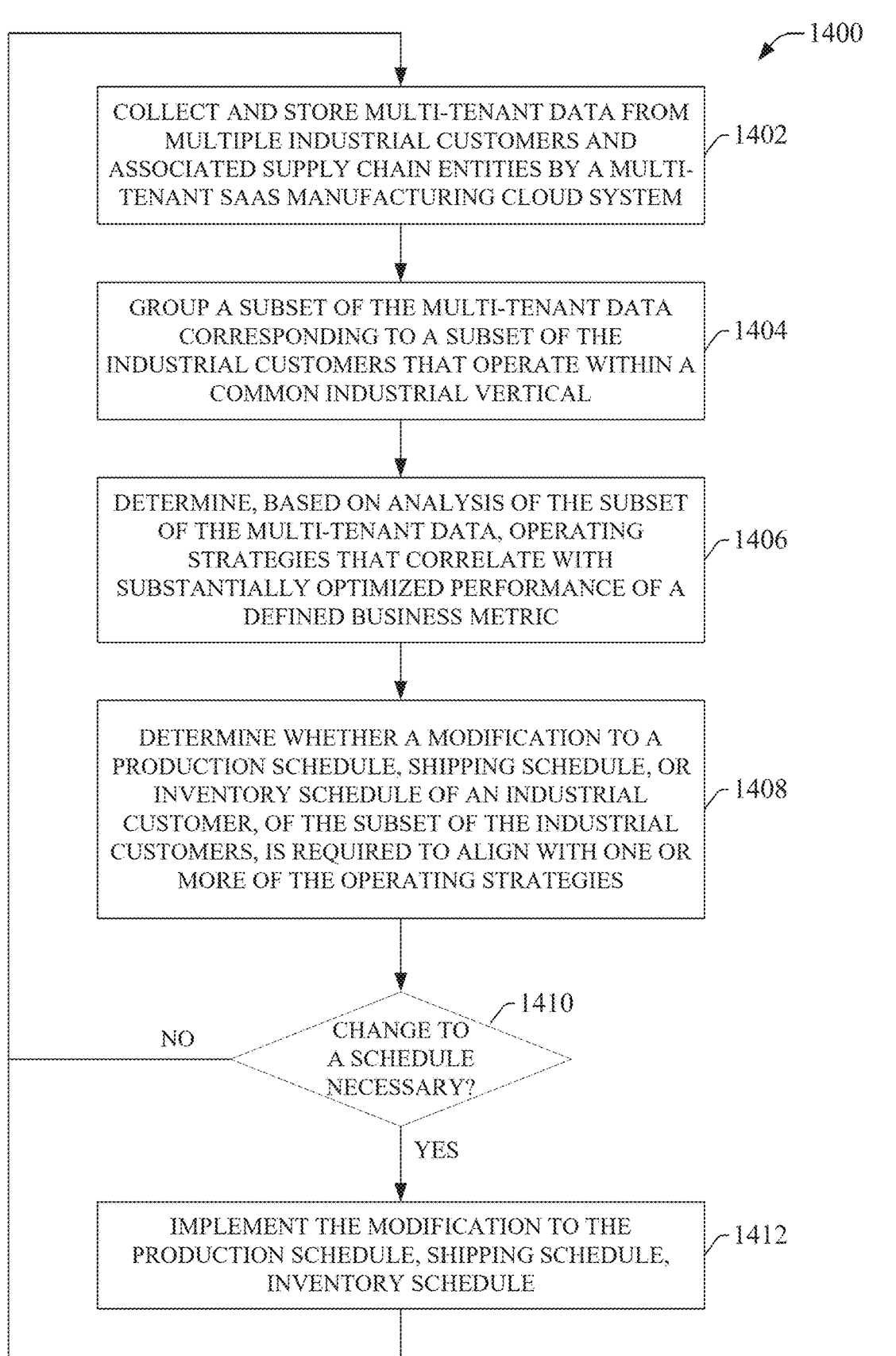

1400

COLLECT AND STORE MULTI-TENANT DATA FROM MULTIPLE INDUSTRIAL CUSTOMERS AND ASSOCIATED SUPPLY CHAIN ENTITIES BY A MULTI-TENANT SAAS MANUFACTURING CLOUD SYSTEM — 1402

GROUP A SUBSET OF THE MULTI-TENANT DATA CORRESPONDING TO A SUBSET OF THE INDUSTRIAL CUSTOMERS THAT OPERATE WITHIN A COMMON INDUSTRIAL VERTICAL — 1404

DETERMINE, BASED ON ANALYSIS OF THE SUBSET OF THE MULTI-TENANT DATA, OPERATING STRATEGIES THAT CORRELATE WITH SUBSTANTIALLY OPTIMIZED PERFORMANCE OF A DEFINED BUSINESS METRIC — 1406

DETERMINE WHETHER A MODIFICATION TO A PRODUCTION SCHEDULE, SHIPPING SCHEDULE, OR INVENTORY SCHEDULE OF AN INDUSTRIAL CUSTOMER, OF THE SUBSET OF THE INDUSTRIAL CUSTOMERS, IS REQUIRED TO ALIGN WITH ONE OR MORE OF THE OPERATING STRATEGIES — 1408

CHANGE TO A SCHEDULE NECESSARY? — 1410

NO

YES

IMPLEMENT THE MODIFICATION TO THE PRODUCTION SCHEDULE, SHIPPING SCHEDULE, INVENTORY SCHEDULE — 1412

FIG. 14

MANUFACTURING CLOUD SYSTEM

TECHNICAL FIELD

The subject matter disclosed herein relates generally to industrial automation systems, and, for example, to cloud-based industrial data collection, analysis, and sharing.

BACKGROUND ART

As cloud-based computing platforms become more widely available, industrial enterprises are exploring ways in which their operations can benefit by moving portions of their operations to the cloud. Moreover, the global scope afforded by cloud computing opens the possibility of multi-tenant industrial software that can serve multiple enterprises and users, and can assist in coordinating operations of facilities or supply chain entities in different locations. However, there are still challenges that render wider implementation of cloud-based industrial solutions difficult, including an inability to easily customize cloud-based services to the specific needs of each industrial customer. There are also limits on the capabilities of cloud-based industrial computing systems that could be overcome by leveraging a broader scope of data and integrating a wider range of tools.

The above-described deficiencies of are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising internal services that implement a manufacturing cloud system, wherein the manufacturing cloud system is a multi-tenant Software-as-a-Service (SaaS) system that executes predefined data collection and analytics services that are accessible to industrial customer entities registered to use the manufacturing cloud system; a user interface component configured to render a chat interface configured to receive, from an industrial customer entity of the industrial customer entities, a natural language input describing a customization to an instance of the data collection and analytics services specific to the industrial customer entity; a generative artificial intelligence (AI) component configured to infer the customization based on analysis of the natural language input; and a customization component configured to reconfigure the instance to implement the customization.

Also, one or more embodiments provide a method, comprising implementing, by a manufacturing cloud system comprising a processor, a multi-tenant Software-as-a-Service (SaaS) system that executes predefined data collection and analytics services that are accessible to industrial customer entities registered to use the manufacturing cloud system; receiving, by the manufacturing cloud system via a chat interface rendered on a client device associated with an industrial customer entity of the industrial customer entities, a natural language input describing a customization to an instance of the data collection and analytics services specific to the industrial customer entity; inferring, by the manufacturing cloud system, the customization based on generative artificial intelligence (AI) analysis of the natural language input; and modifying, by the manufacturing cloud system, the instance to implement the customization.

Also, according to one or more embodiments, a non-transitory computer-readable medium is provided having stored thereon instructions that, in response to execution, cause a system to perform operations, the operations comprising executing a manufacturing cloud system on a cloud platform, wherein the manufacturing cloud system is a multi-tenant Software-as-a-Service (SaaS) system that executes predefined data collection and analytics services that are accessible to industrial customer entities registered to use the manufacturing cloud system; receiving, via a chat interface rendered on a client device associated with an industrial customer entity of the industrial customer entities, a natural language input describing a customization to an instance of the data collection and analytics services specific to the industrial customer entity; inferring the customization based on generative artificial intelligence (AI) analysis of the natural language input; and modifying the instance to implement the customization.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 4 is a diagram illustrating a high-level, generalized architecture of the manufacturing cloud system.

FIG. 11 is a flowchart of an example methodology for dynamically modifying an industrial enterprise's production, shipping, or inventory schedules using a global, multi-tenant manufacturing cloud system that executes as an SaaS on a cloud platform and provides industrial services to multiple customer.

FIG. 13a is a flowchart of a first part of an example methodology for customizing cloud-based manufacturing services using generative AI.

FIG. 14 is a flowchart of an example methodology for optimizing an industrial customer's manufacturing or business operations based on analysis of multi-tenant by a manufacturing cloud system that executes as an SaaS on a cloud platform.

DETAILED DESCRIPTION

Figure 1:
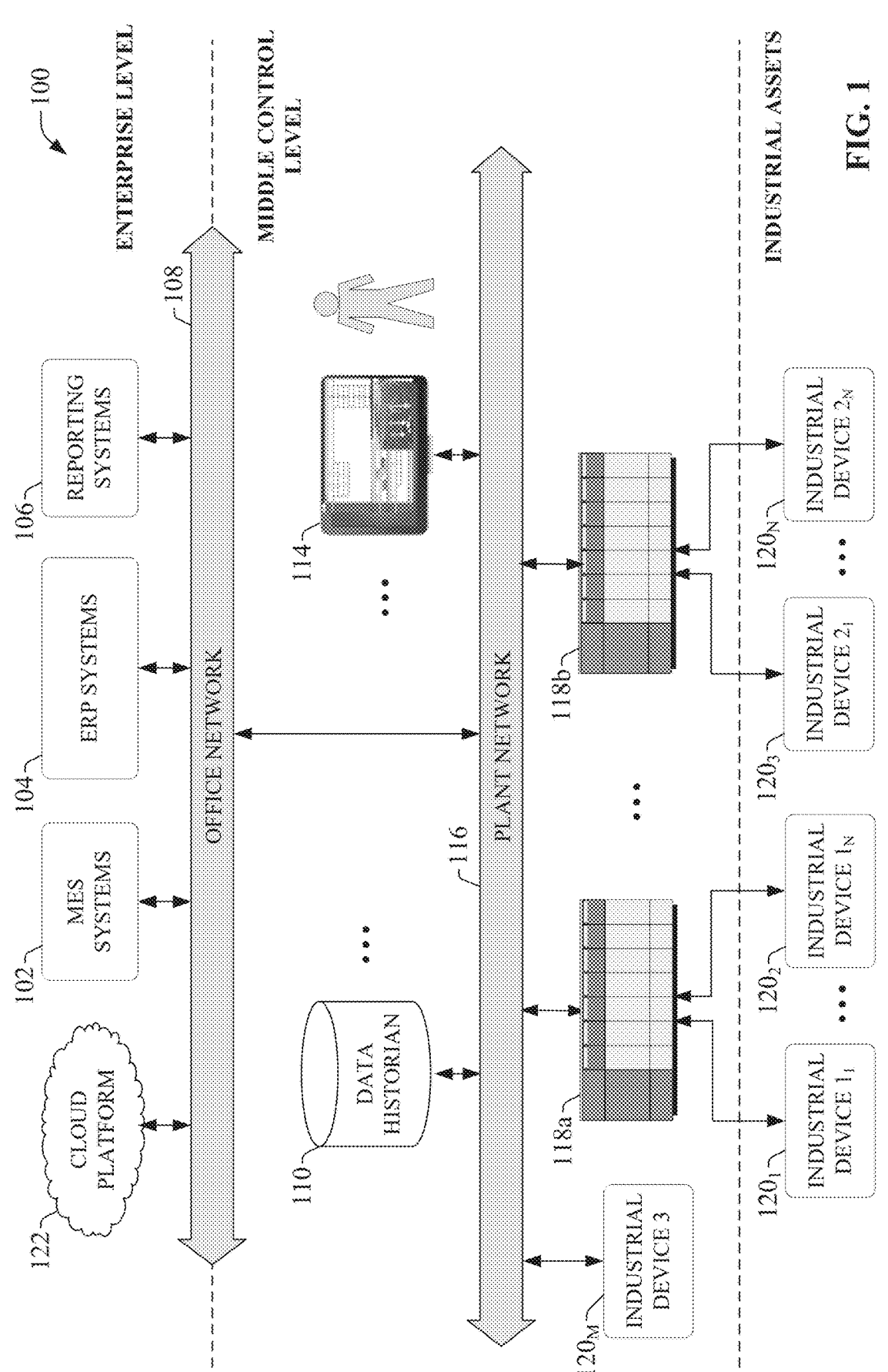
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes. Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process.

These programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller that executes on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. These higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level in view of higher-level business considerations, driving those control-level operations toward outcomes that satisfy defined business goals (e.g., order fulfillment, resource tracking and management, asset utilization tracking, etc.). Reporting systems 106 can collect operational data from industrial devices on the plant floor and generate daily or shift reports that summarize operational statistics of the controlled industrial assets.

As cloud-based computing platforms become more widely available, industrial enterprises are exploring ways in which their operations can benefit by moving portions of their operations to the cloud. The global scope afforded by cloud computing also opens the possibility of multi-tenant industrial software that can serve multiple enterprises and users, and can assist in coordinating operations of multiple facilities or supply chain entities in different locations.

However, there are still challenges that render wider implementation of cloud-based industrial solutions difficult, including an inability to easily customize cloud-based services to the specific needs of each industrial customer. There are also limits on the capabilities of cloud-based industrial computing systems that could be overcome by leveraging a broader scope of data and integrating a wider range of tools.

To address these and other issues, one or more embodiments described herein provide a multi-tenant, cloud-based Software-as-a-Service (SaaS) manufacturing platform that offers a variety of industrial applications to registered customers, including but not limited to MES, ERP, quality management, supply chain management and planning, customer relationship management (CRM), and dynamic context-based operations planning and scheduling. In addition to supporting these cloud-based industrial support services, the manufacturing cloud system includes extensibility tools that allows industrial customers to easily customize databases, data collection templates, reporting fields, and other features of their consumed services, eliminating the need for these features to be customized by an administrator of the cloud system. Some embodiments of the manufacturing cloud system can also leverage generative artificial intelligence (AI) in connection with executing its supported services, which can improve the speed, scope, and accuracy of those services.

Figure 2:
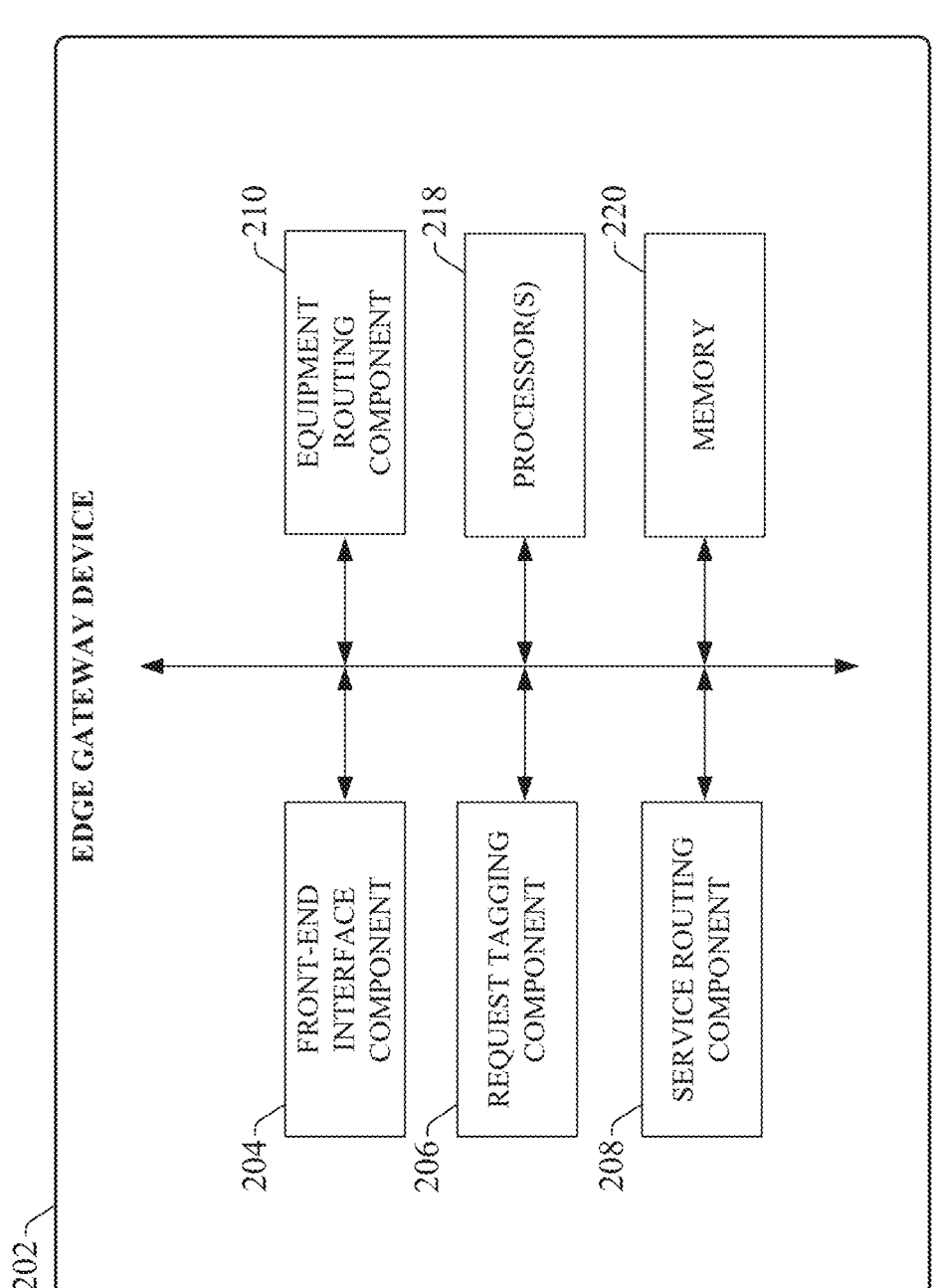
FIG. 2 is a block diagram of an example edge gateway device.

FIG. 2 is a block diagram of an example edge gateway device 202 according to one or more embodiments of this disclosure. Edge gateway device 202 can be one of several edge gateway devices of an edge layer through which customers or tenants can access to the manufacturing cloud system described herein. Edge gateway device 202 can include a front-end interface component 204, a request tagging component 206, a service routing component 208, an equipment routing component 210, one or more processors 218, and memory 220. In various embodiments, one or more of the front-end interface component 204, request tagging component 206, service routing component 208, equipment routing component 210, the one or more processors 218, and memory 220 can be electrically and/or communicatively coupled to one another to perform one or more of the functions of the edge gateway device 202. In some embodiments, components 204, 206, 208, and 210 can comprise software instructions stored on memory 220 and executed by processor(s) 218. Edge gateway device 202 may also interact with other hardware and/or software components not depicted in FIG. 2. For example, processor(s) 218 may interact with one or more external user interface devices, such as a keyboard, a mouse, a display monitor, a touchscreen, or other such interface devices.

Front-end interface component 204 can be configured to interface with industrial devices and systems, client devices, or other customer equipment and to exchange data with those customer-side devices and systems. Request tagging component 206 can be configured to tag a request received via the front-end interface component 204 with a tenant identifier and other metadata that can be used to facilitate routing of the request to the appropriate data center, region, or service. Service routing component 208 can route the request to the appropriate data center, region, or service based in part on the metadata added by the request tagging component 206. Equipment routing component 210 can be configured to pass configuration settings delivered by the manufacturing cloud system to the appropriate plant-floor equipment for implementation.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
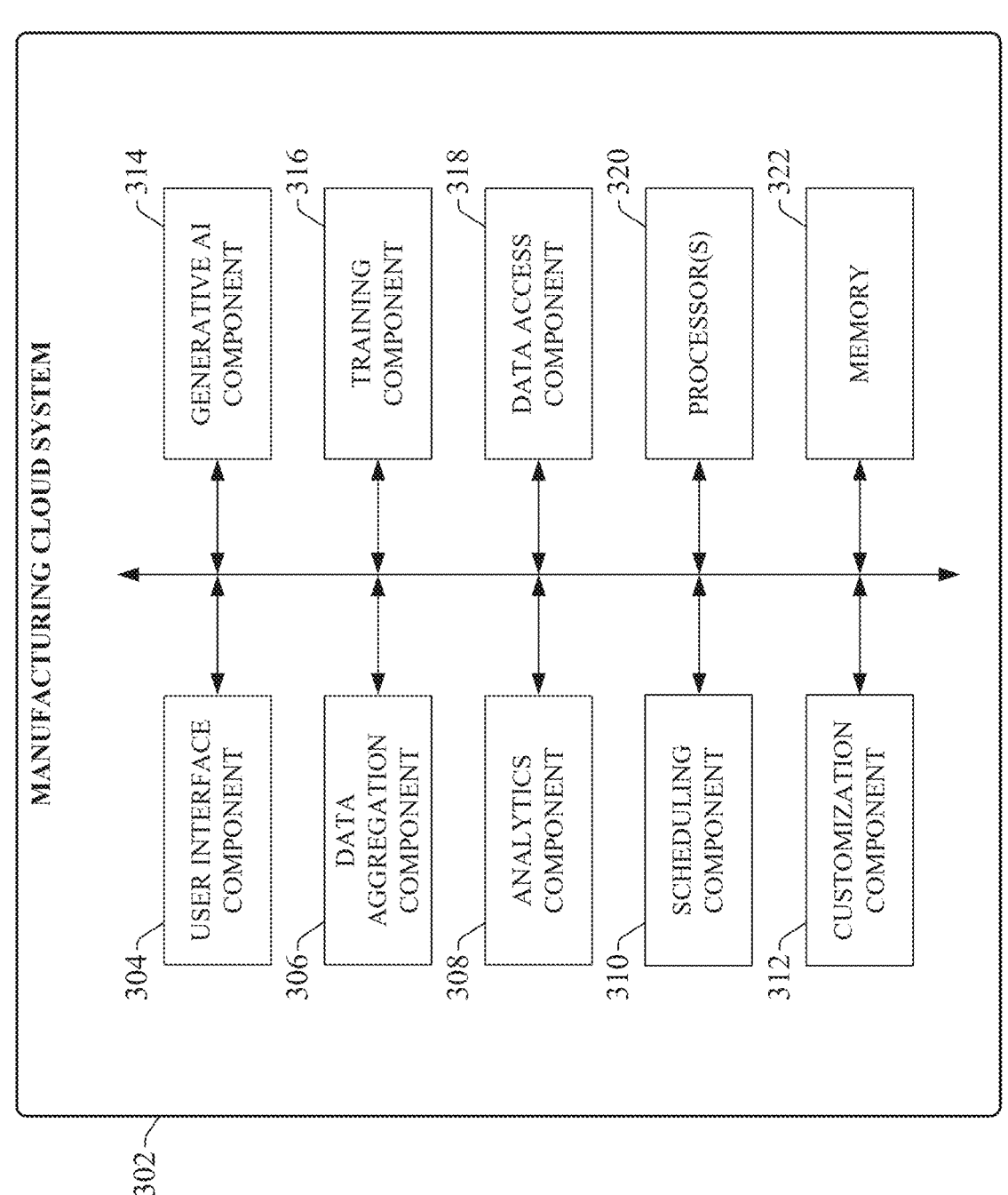
FIG. 3 is a block diagram of an example manufacturing cloud system.

FIG. 3 is a block diagram of an example manufacturing cloud system 302 according to one or more embodiments of this disclosure. Although depicted in FIG. 3 as being implemented on a single hardware platform, manufacturing cloud system 302 can be implemented on a distributed hardware and software architecture of a cloud platform—including data centers, internal services, edge gateway devices, service mesh layer components, and other such platform components—and can serve as a multi-tenant SaaS system that provides a variety of industrial software services to multiple customers. Manufacturing cloud system 302 can include a user interface component 304, a data aggregation component 306, an analytics component 308, a scheduling component 310, a customization component 312, a generative AI component 314, a training component 316, a data access component 318, one or more processors 320, and memory 322. In various embodiments, one or more of the user interface component 304, data aggregation component 306, analytics component 308, scheduling component 310, customization component 312, generative AI component 314, training component 316, data access component 318, the one or more processors 320, and memory 322 can be electrically and/or communicatively coupled to one another to perform one or more of the functions of the manufacturing cloud system 302. In some embodiments, components 304, 306, 308, 310, 312, 314, 316, and 318 can comprise software instructions stored on memory 322 and executed by processor(s) 320.

User interface component 304 can be configured to generate and render, on client devices of authorized customers (e.g., laptop computers, tablet computers, smart phones, etc.), user interfaces for interacting with the manufacturing cloud system 302. In some embodiments, the user interfaces can be rendered via a web browser application or another type of client application that executes on the client device. The user interfaces can render customer-specific information generated by the 302, including but not limited to production or work schedules, supply chain or line management information, custom reports, MES or ERP data, quality management data, or other such information. The user interfaces can also receive user input and submit this input to the system 302. This user input can include, for example, navigational input for invoking user interfaces for viewing different types of information, customization input defining customer-specific customizations to aspects of the system's services (e.g., addition or removal of data fields, customizations to a data collection template or schema, etc.), natural language questions regarding plant operations or schedules, or other such user inputs.

Data aggregation component 306 can be configured to retrieve muti-source, multi-tenant data from various sources for collective analysis. This data can include multi-tenant data collected or generated by the manufacturing cloud system 302 itself, information regarding supply chain conditions or issues collected from extrinsic sources or generated by the system 302, information published by vendors of industrial devices or equipment, customer demand information, product or material transportation schedules, information regarding industrial standards, or other such information.

Analytics component 308 can be configured to apply one or more types of analytics on the multi-tenant data maintained by the system 302 as well as other data retrieved or received by the data aggregation component 306. These analytics can support a range of different types of industrial services supported by the manufacturing cloud system 302, to be described in more detail herein. Scheduling component 310 can be configured to generate or modify production schedules, work schedules, transportation schedules, or other such planning information based on results of analysis performed by the analytics component 308.

Customization component 312 can be configured to execute various extensibility tools that allow customer entities or industrial enterprises to customize aspects of the system's services. Generative AI component 314 can be configured to assist the analytics component 308 with performing its analytic functions using generative AI. To this end, the generative AI component 314 can implement prompt engineering functionality using associated trained models trained with domain-specific industrial training data. The generative AI component 314 can generate and submit prompts or meta-prompts to one or more generative AI models and associated neural networks, where these prompts are generated based on the analytic function being performed by the analytics comment 308 as well as domain-specific information contained in the trained models. Depending on the nature of the analytics being performed, the responses returned by the generative AI model in response to the prompts can be used by the analytics component 308 or the user interface component 304 to converge on insights into the customer's plant operations, generate or update schedules, formulate recommendations for improving or optimizing plant operations, or perform other such functions. Training component 316 can be configured to train the trained models used by the generative AI component 314 with various types of relevant training data.

Data access component 318 can be configured to manage customer access to data generated and stored by the industrial applications executed by the manufacturing cloud system 302. The one or more processors 320 can perform one or more of the functions described herein with reference to the systems and/or methods disclosed. Memory 322 can be a computer-readable storage medium storing computer-executable instructions and/or information for performing the functions described herein with reference to the systems and/or methods disclosed.

Figure 4:
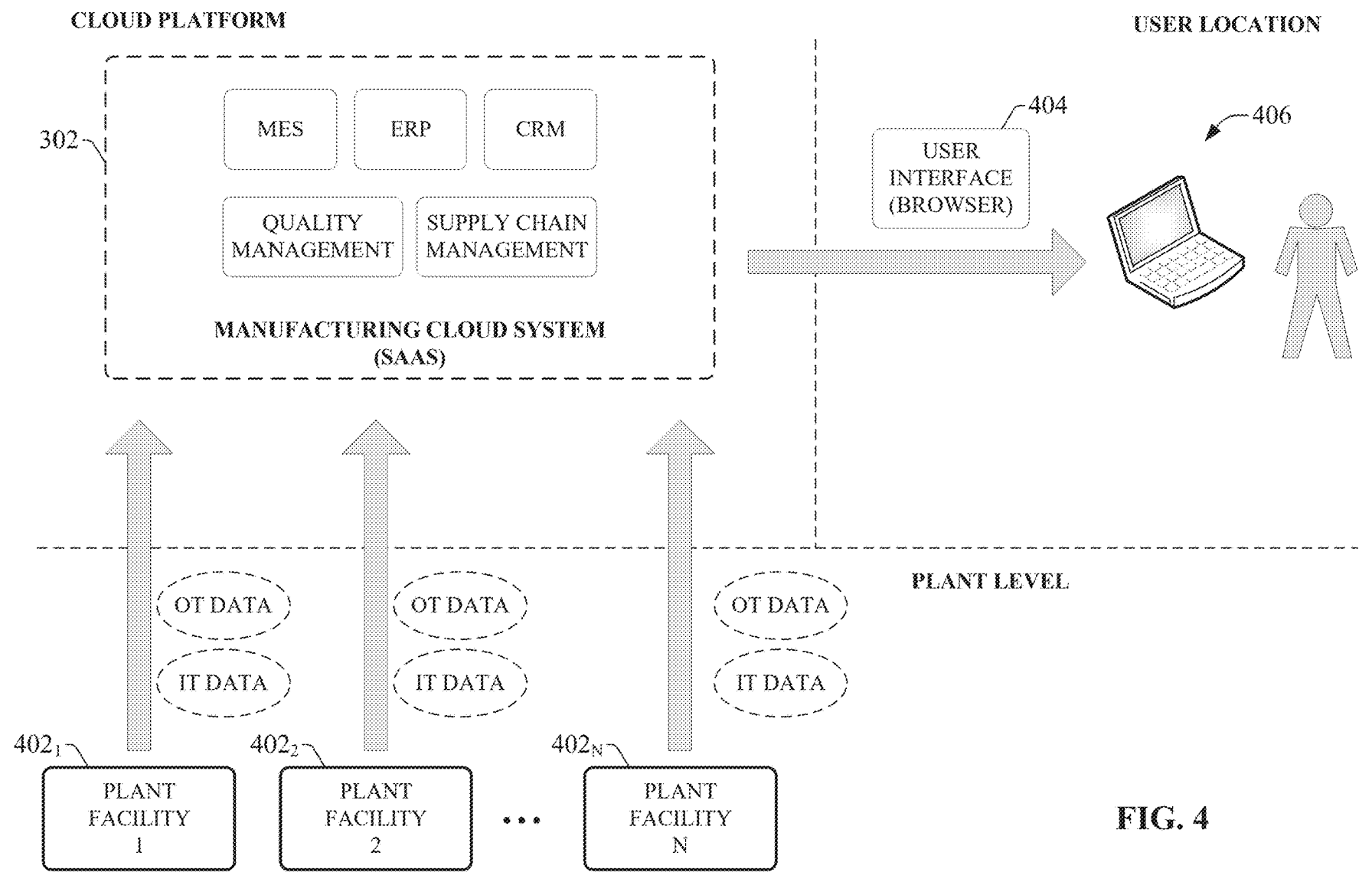

FIG. 4 is a diagram illustrating a high-level, generalized architecture of the manufacturing cloud system 302 according to one or more embodiments. In general, the manufacturing cloud system is a multi-tenant Software-as-a-Service (SaaS) manufacturing platform the executes on a cloud platform. The system 302 is accessible to multiple customers and offers a range of industrial solutions and applications, including but not limited to MES, ERP, customer relationship management (CRM), supply chain management, quality management, production monitoring, asset performance management (APM), and other such industrial applications. The system 302 can operate at scale and manages access to its services by a global base of customers across geographic boundaries. The system's customers can comprise different industrial enterprises, at least some of which may operate multiple geographically diverse industrial facilities 402. These customers can connect selected portions of their OT and IT systems to the manufacturing cloud system 302, and permit collection, storage, and analysis of selected sets of data from these systems by the industrial software services executing on system 302. The manner of processing, management, and storage of a customer's data depends on the types of manufacturing applications or services being used by the customer (e.g., ERP, MES, supply chain management, production monitoring and optimization, etc.), and may also be a function of the geographic boundaries between entities having a business relationship (e.g., different facilities owned by a common industrial enterprise, different customer entities of a supply chain, customer entities and supplier entities who provide parts or material to the customer entities, etc.).

Example manufacturing functions that can be carried out by the manufacturing cloud system 302 can include, but are not limited to, optimized production or work scheduling; analysis and improvement of process quality and repeatability; management of inventory (e.g., where inventory can comprise units of production, materials used in the manufacturing process, spare parts and devices, etc.); production management; assessing and maintaining compliance with industry regulations; data connectivity or sharing between supply chain entities or between facilities of an enterprise; trend analysis; digital and physical transaction tracking; automation of workflows; supply chain planning and optimization; lot traceability; real-time process visualization; or other such applications. Offering these services as cloud-based SaaS applications allows the services to be easily scaled to accommodate a global customer base, can simplify integration of these applications within customer facilities, and can remove the burden of maintaining on-premise manufacturing software from industrial customers. The system's multi-tenant model allows different customers to be logically grouped into tenants. Access to, and sharing of, customer-owned data is controlled by logical isolation of the tenants.

The manufacturing cloud system 302 offers customers visibility into their processes, or other information obtained based on analysis of the customer's production data, via one or more custom user interfaces 404 (generated by user interface component 304). In some embodiments, the system 302 can be accessed by authorized users via a web browser executing on the users' client devices 406, and the manufacturing cloud system 302 can render the user interface 404 on the client device 406 as a web-based interface. Alternatively, other types of customer-side client interfaces 404 can be used to render information generated by the system 302 to the user, and to receive information from the user for submission to the system 302. The formats of the interfaces 404, and the types of data presented, depend on the application in use, and can be at least partially customized by each customer using the system's extensibility tools, as will be described in more detail herein.

Figure 5:
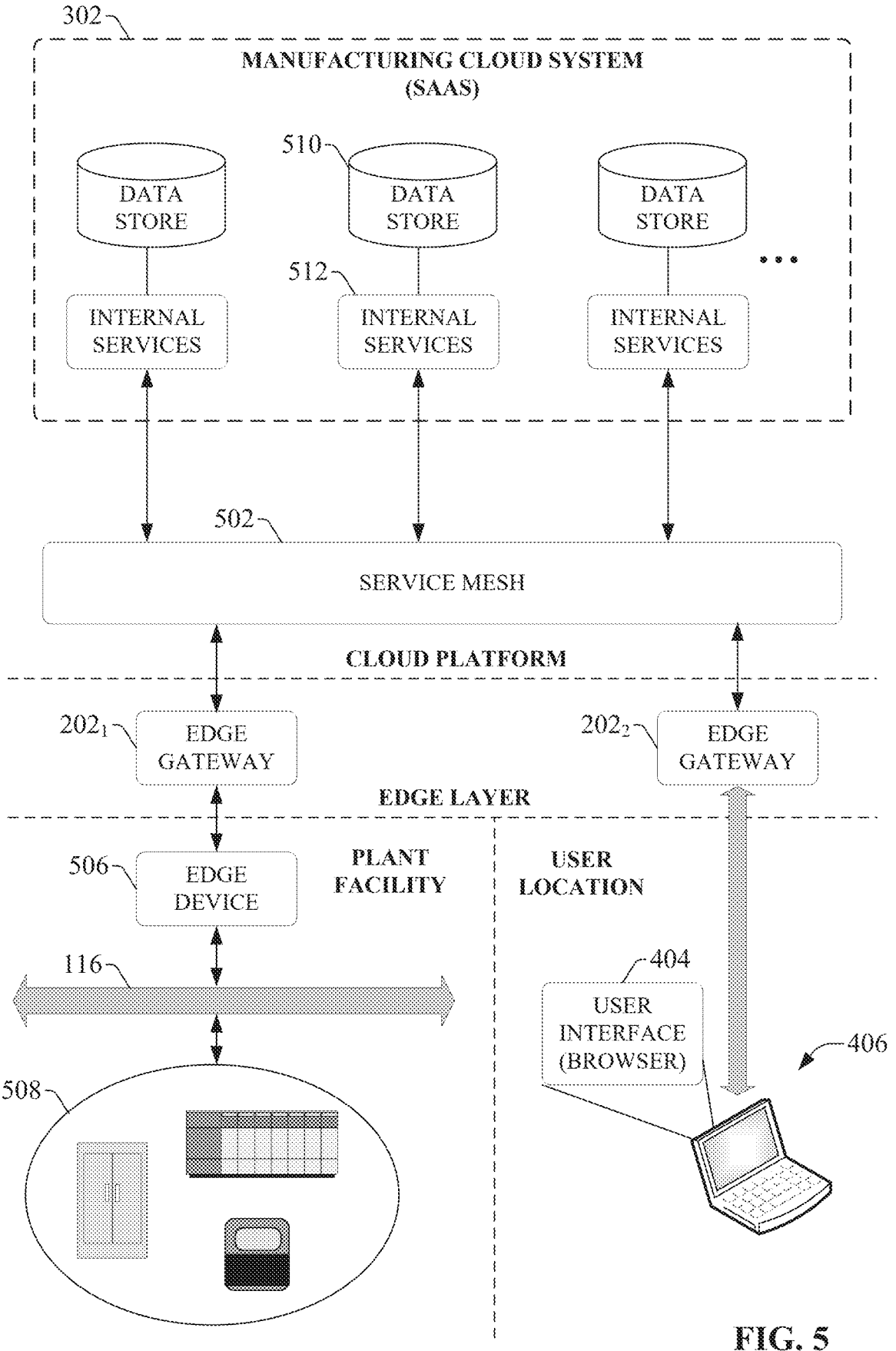
FIG. 5 is a diagram of a general architecture for implementing the manufacturing cloud system.

FIG. 5 is a diagram of a general architecture for implementing the manufacturing cloud system 302 according to one or more embodiments. In general, entities such as data sources 508 within plant facilities (e.g., industrial devices and systems, IT systems, etc.) as well as customer-owned client devices 406 can communicatively access the system 302 via an edge layer comprising edge gateway devices 202. In the example architecture of FIG. 5, industrial data sources 508 are interfaced with the edge gateway devices 202 via one or more edge devices 506 installed within the facility. However, some data sources 508 may interface with the edge gateway device 202 directly without the use of an edge device 506, or may act as an edge device themselves. Example data sources 508 can include, but are not limited to, monitoring and control devices associated with industrial automation systems (e.g., industrial controllers and their associated I/O, motor drives, industrial robots, vision systems, etc.), as well as sources of IT data for the industrial enterprise (e.g., employee databases, purchase order systems, inventory tracking systems, billing and accounting systems, human resource management systems, etc.).

Figure 6:
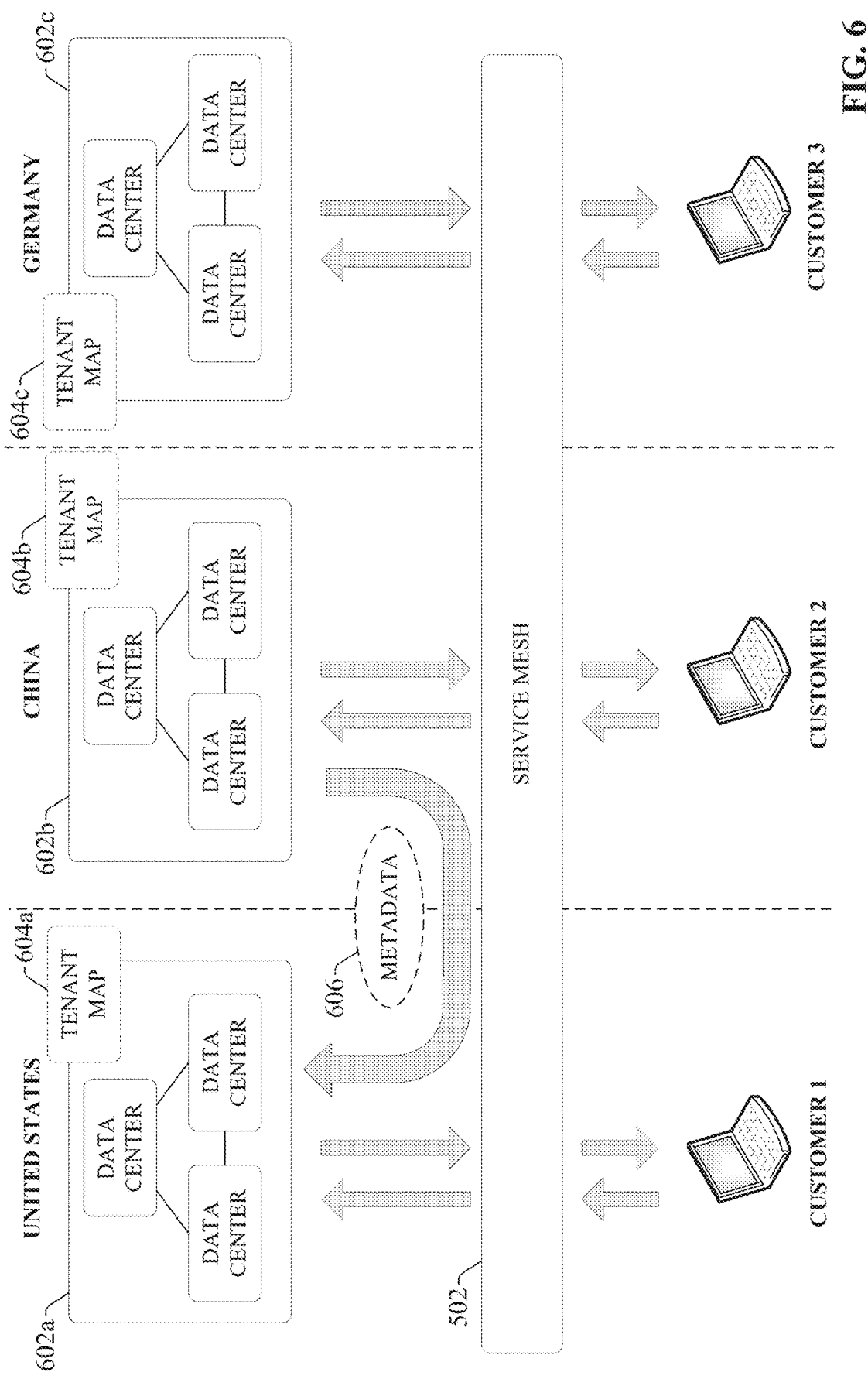
FIG. 6 is a diagram illustrating three example sets of data centers located at respective three geographic locations, and which store data collected from, or generated for, multiple different customers of the manufacturing cloud system.

The manufacturing cloud system 302 itself can execute a number of internal services 512, and associated internal backup stores 510, in connection with operating and managing the industrial software services offered by the system 302. These internal services 512 can be segregated across multiple different data servers. The computing and data storage infrastructure for the manufacturing cloud system 302 can include multiple data centers that are distributed globally and which store data collected from the system's industrial customers as well as information generated by the system's manufacturing applications (e.g., MES, ERP, etc.) based on analysis of the customer data. FIG. 6 is a diagram illustrating three example sets of data centers 602 that are located at respective three geographic locations, and which store data collected from, or generated for, multiple different customers of the manufacturing cloud system 302. Each set of data centers 602 may store and manage data for customers located in the same region, while selectively making the data available to users or customers in other regions if permitted.

The system's multi-tenant model allows different customers to be logically grouped into tenants. Access to, and sharing of, customer-owned data is controlled by logical isolation of these tenants. In some multi-tenant systems, data is made available to entities who are permitted to access that data-including the owners of the data as well as other entities having a business relationship with the data owner that permits those entities a degree of access to the data-via replication of the data across regions and data centers 602.

In some embodiments, contextual mapping can be used to enable reporting across an entire system, regardless of geographic boundaries. To accomplish this, the edge gateway devices 202 of the edge layer, the user interfaces 404, and the internal services 512 of the system 302 can connect through a service mesh 502 (made up of one or more service mesh systems or devices). This allows the internal services 512, which have their own internal backing stores 510, to divide across multiple data centers 602, with the service mesh 502 ultimately directing the communications between the internal services 512, edge gateway devices 202, and user interfaces 404.

The use of a service mesh 502 can also reduce or eliminate the need for data replication, since data stored at a data center 602 can be accessed by authorized users while remaining in that data center 602. Instead, the devices of the service mesh 502 can package data to be shared as a deployment artifact comprising metadata 606 (e.g., metadata about the system, application, or workflow that produced the data), and route this metadata 606 to other data centers 602 as needed without the need for data replication, making the data available to customers or other authorized entities within the region in which those other data centers 602 reside.

In the case of data to be shared among customers or tenants who do not reside in a common geographical region, or if customers are divided across services and regions, the system 302 can make a determination as to whether the data is an enterprise-level or tenant-level concern, and provide this decision at the tenant level. The system 302 can maintain tenant maps 604 that define relationships between tenants of the system 302, including relationships between industrial customers and the various suppliers that supply parts, materials, or equipment to those customers. In general, the tenant maps 604 can define customer entities of various types—including but not limited to manufacturing entities, supplier entities, supply chain entities, warehouse entities, retailers, or other such entity types—as well as definitions of which of the entities are permitted to share data. The tenant maps 604 can also specify any limitations or conditions on sharing of data between the entities (e.g., an explicit indication of the types of data that are permitted to be shared, or types of data that are prohibited from being shared). The scope of data sharing permissions between customers can be defined explicitly by the tenant maps 604, or may be inherent based on the type of business relationship between two customers defined by the tenant maps 604 (e.g., a supplier/manufacturer relationship, a manufacturer/shipper relationship, a manufacturer/retailer relationship, etc.). The service mesh 502 can reference these tenant maps 604 to determine which tenants are permitted to access certain data sets, in connection with routing and sharing of data or metadata 606.

Providing a service mesh 502 that manages routing of data or metadata 606 allows the manufacturing cloud system 302 to be unlimited in terms of where the system 302 can execute. Deployment options for various embodiments of the manufacturing cloud system 302 can include on-premise, shared multi-tenant, deployment within a customer's own tenant, or a hybrid deployment in which the system executes primarily on-premise but is managed from the cloud platform.

Figure 7:
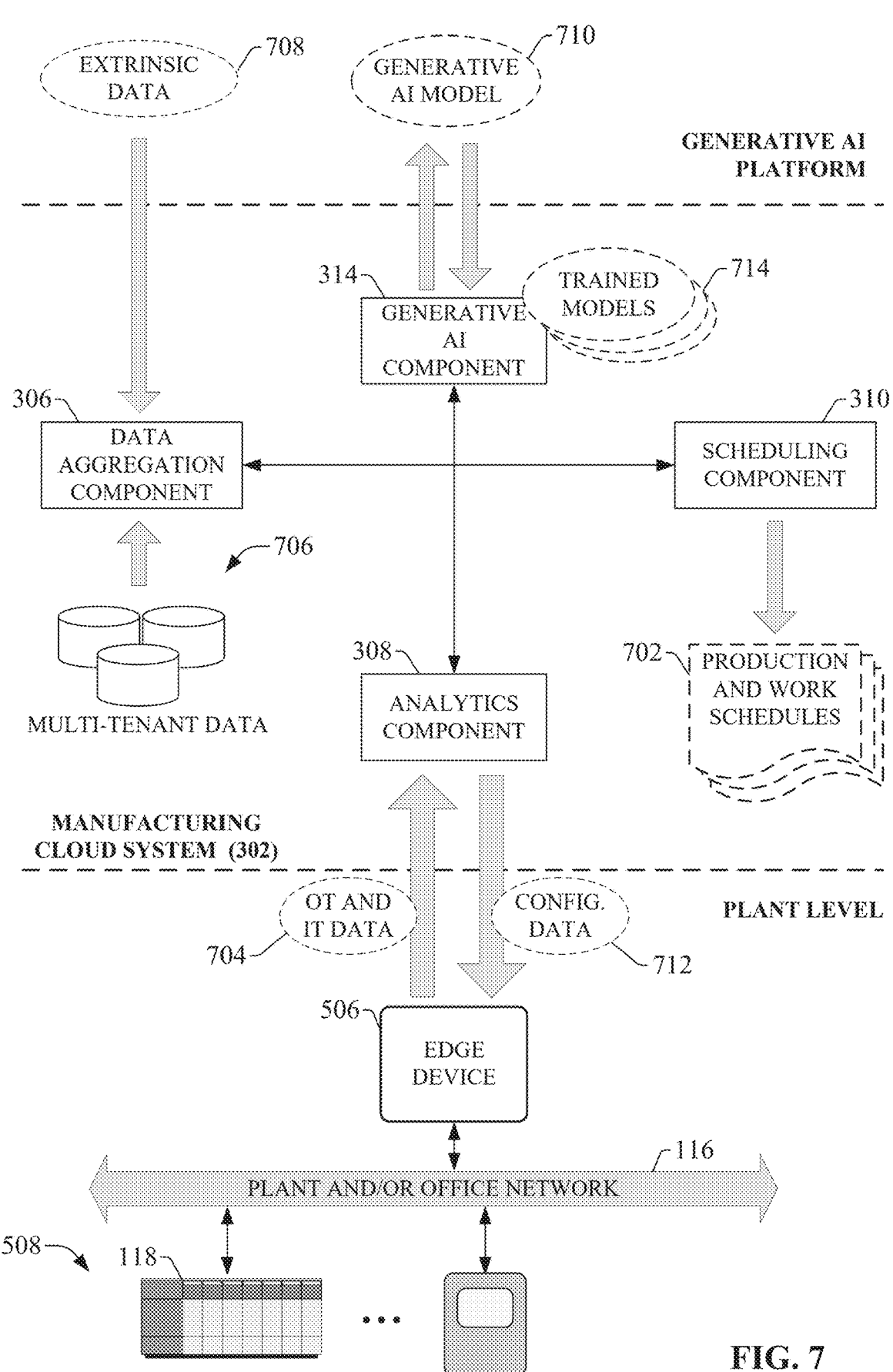
FIG. 7 is a diagram illustrating a general architecture in which the manufacturing cloud system collects and analyzes data from customers' data sources together with multi-tenant data and extrinsic data from other sources for the purposes of line management and traceability.

FIG. 7 is a diagram illustrating a general architecture in which the manufacturing cloud system 302 collects and analyzes data 704 from customers' data sources 508 (e.g., the monitoring and control devices of the customers' automation systems or industrial processes, business-level or IT systems, etc.) together with multi-tenant data 706 maintained by the system 302 and extrinsic data 708 from other sources for the purposes of line management and traceability. Although various functions of the manufacturing cloud system 302 are depicted in FIG. 7 as being performed by instances of discrete components, the functions ascribed to the components depicted in FIG. 7 can be executed as part of the system's internal services 512 across multiple data servers, and may be replicated or distributed across more than one data server.

As noted above, the manufacturing cloud system 302 can collect, store, and analyze OT and IT data 704 from multiple industrial customers (or tenants) and provide a variety of line management, traceability, planning, scheduling, and supply chain services to these customers based on analysis of this data 704 (only a single customer is depicted in FIG. 7). The data 704 collected from a given industrial customer, as well as results of analytics performed on this data 704 as part of the cloud-based services, are stored (e.g., on data centers 602) as part of the greater collection of multi-tenant data 706 collected from the multiple industrial customers who are registered to use the system's services. The system 302 maintains segregation between the data 704 collected from different industrial customers to ensure security of each customer's proprietary data while also supporting anonymized collective analysis of the multi-tenant data 706, as will be described in more detail herein. The OT and IT data 704 can include, but is not limited to, data generated by industrial monitoring and control devices associated with industrial automation systems (e.g., industrial controllers and their associated I/O, motor drives, industrial robots, vision systems, etc.), telemetry data collected from meters or sensors (e.g., flow meters, temperature meters, pressure meters, vibration sensors, etc.), production schedule data, work schedule data, plant employee information obtained from plant databases (including identities, roles, and training of those employees), purchase order data, inventory data, billing and accounting data, human resource management data, or other such information. Multi-tenant data 706 can also include information about each customer's business, including the industrial vertical in which the customer operates (e.g., automotive, food and drug, textiles, mining, etc.), industrial assets and production lines maintained by the customer, products or materials manufactured by the customer, or other such information.

In connection with performing its various industrial support services, the manufacturing cloud system 302 can aggregate and collectively analyze a customer's real-time and historical OT and IT data 704, selected sets of other multi-tenant data 706 maintained by the system 302, and selected extrinsic data 708 obtained from external systems. The sets of data required for a given analytic function can be obtained by a data aggregation component 306, which provides the collected data to the analytics component 308. Example extrinsic data 708 that can be retrieved and processed by the manufacturing cloud system 302 in connection with providing cloud-based industrial services can include, but is not limited to, information regarding customer demand for a product or material manufactured by an industrial customer, information published by industrial equipment vendors about their products (e.g., product specifications, known functional or security issues, etc.), information regarding supply chain conditions (e.g., expected availability of a component or material required by an industrial customer to manufacture a product, known supply chain disruptions or delays, etc.), transportation schedules for parts or materials required by the industrial customer, information regarding industry standards for different industrial verticals (e.g., global or vertical-specific safety standards, food and drug standards, design standards such as the ISA-88 standards, etc.), or other such extrinsic or contextual information. The data aggregation component 306 can obtain extrinsic data 708 from external systems accessible by the manufacturing cloud system 302, or the system 302 may generate at least some of the extrinsic data 708 based on the multi-tenant data 706 collected by the system 302 from registered business entities.

The manufacturing cloud system's analytics component 308 can apply proactive analytics to the range of multi-tenant data 706 collected and stored on the platform, and provide dynamic line and supply chain management services based on this analysis. This can include generating line-level, inventory, or shipping recommendations, or dynamic modifications to line-level or supply chain operations and planning schedules, based on current supply chain conditions. For example, in some embodiments the manufacturing cloud system 302 can maintain and dynamically update an industrial customer's production or operator work schedules 702 to optimize one or more business metrics (e.g., profitability, product output, production costs, demand fulfilment, product quality, etc.) based on an analysis of real-time supply chain conditions—as determined from supply chain condition information obtained as part of extrinsic data 708—relative to the customer's production goals and options (or to cause the one or more business metrics to satisfy a defined optimization criterion). In general, production schedules can define which products or materials each production line of an industrial enterprise is scheduled to manufacture during different time periods. Operator work schedules can define which plant operators or maintenance personnel are scheduled to work, and to which production lines or stations those employees are to be assigned, for different time periods.

In an example scenario, the analytics component 308 can identify, based on analysis of supply chain updates obtained from extrinsic data 708, a supply chain disruption that will render a component used in customer's manufacturing process for a first product unavailable during a predicted time period. In response to identifying this disruption, the analytics component 308 can make a decision as to whether the customer's production schedule should be modified—e.g., to reconfigure the production line to manufacture, during the period originally designated to assemble the first product, a different second product that does not require the delayed component, until the component is expected to arrive—or, alternatively, to produce and ship the incomplete product as scheduled based on a determination that the component is inessential or can be shipped to the end purchasers of the product after the fact. The scheduling component 310 can also change the time period during which a given product is scheduled to be manufactured, change the type of product schedule to be manufactured during a given time period, or perform other such changes. If needed, the scheduling component 310 can also update other relevant schedules to support these production schedule modifications. For example, the scheduling component 310 may update product shipping schedules to schedule shipment of a missing component after shipping of the product requiring the component, update operator work schedules to support production schedule changes, change a supplier or source from which to obtain a component part or material required to manufacture a product, or modify other such schedules.

The analytics component 308 and scheduling component 310 can dynamically update production schedules, operator work schedules, purchase orders for components or materials, or shipping schedules for materials or products to satisfy a defined business metric or goal—e.g., profit maximization or maximization of demand fulfilment—based on a combination of current supply chain conditions (as determined from extrinsic data 708 conveying the status of respective supply chain entities and shipping routes) as well as a current context of the customer's manufacturing or business operations, as determined based on analysis of relevant subsets of the customer's MES data, such as the customer's levels of inventory of respective products, inventory levels of component parts or materials used to manufacture the products, actual or predicted demand for respective products manufactured by the customer, current or scheduled capabilities of the customer's respective production lines, or other such information. In general, the analytics component 308 can determine suitable updates to the customer's schedules that are predicted to cause the specified business metric to satisfy the specified business metric given the constraints of the current context of the customer's manufacturing or business operations, as well as the current context of the supply chain in which the customer participates.

In some embodiments, the analytics component 308 can generate additional context for this analysis by leveraging the pool of multi-tenant data 706 maintained on the SaaS platform for multiple different industrial customers. For example, as part of the dynamic optimization analysis for a customer that manufactures product for a specific industrial vertical (e.g., automotive, food and drug, textiles, marine, oil and gas, etc.), the data aggregation component 306 can aggregate or group a subset of the multi-tenant data 706 collected or generated for other industrial customers operating within the same industrial vertical (or that perform similar manufacturing processes), and based in part on analysis of this selected subset of the multi-tenant data 706, the analytics component 308 can determine operational changes for the customer that are predicted to satisfy the defined business goal. In general, this multi-tenant analysis can learn, based on analysis of multi-tenant data 706 for a subset of customers within a common industrial vertical, strategies for manufacturing scheduling, shipping scheduling, operator work scheduling, and purchasing that correlate with satisfaction of the defined business goal, or that cause a specific business metric to satisfy an optimization criterion.

Once the manufacturing cloud system 302 has formulated a business goal optimization strategy based on results of this multi-tenant optimization analysis, the system 302 can dynamically implement the strategy as needed by modifying one or more schedules 702 (e.g., production schedules, shipping schedules, work schedules, etc.); generating a bill of materials for materials, component parts, or products; or automatically modifying the customer's automation control sequences in accordance with the formulated strategy.

At any time, authorized users associated with the industrial customer can view the schedules 702 maintained by the system 302 via a user interface 404 generated by the user interface component 304. In some embodiments, the system 302 can also automatically and remotely modify industrial asset configuration settings to support the modified production schedules. For example, the analytics component 308 may remotely generate and send configuration data 712 to one or more industrial devices or assets of a production line, where this configuration data 712 is designed to reconfigure the industrial devices of the production line to manufacture the alternative second product in the expected absence of the required component for the originally planned first product. This configuration data 712 can include, for example, updated device configuration settings, modified industrial control code for execution on an industrial controller 118, or other such configuration data. In such scenarios, the manufacturing cloud system 302 can send the configuration data 712 to the customer's edge gateway device 202, which routes the data to the necessary industrial device or asset (e.g., using equipment routing component 210). Other architectures for relaying configuration data 712 to a customer's on-premise assets (with or without an edge gateway device 202) are also within the scope of one or more embodiments.

Connectivity between the system's multi-tenant SaaS platform and the edge level can also be used to automate business transactions and enforce the MES stack on the plant floor. For example, the manufacturing cloud system 302 can serve as the system of record for machine settings and pass these configuration settings as configuration data 712 directly to the equipment, eliminating layers.

The analytics component 308 can monitor and consider other factors in connection with performing dynamic updates to a customer's various schedules 702, including but not limited to customer demand for a product, employee work schedules, the capabilities and operating schedules of the customer's machines or production lines (taking account planned or unplanned machine shutdowns), transportation schedules, or other such factors. Automated interventions that can be performed by the system 302 based on analysis of these factors can include, but are not limited to, production schedule adjustments, real-time control or device configuration adjustments, shipping schedule adjustments, purchasing schedule adjustments (e.g., updating a purchasing schedule to source materials from alternative sources if a disruption of the currently scheduled source is identified), or other such interventions.

In some embodiments, the analytics component 308 can monitor product quality of an industrial customer's manufacturing output and identify factors contributing to the quality of the end product. For example, some embodiments of the analytics component 308 can apply artificial intelligence (AI) to the customer's OT data 704 over time to identify operational or event patterns during production, and correlate these patterns to observed product quality metrics (as determined based on results of human or automated quality verification systems, such vision systems or manual inspection stations) to infer reasons why a product's quality metrics deviate from acceptable tolerances. This analysis can consider such factors as vendor-specific device or asset issues (as learned from product issue notifications published by the relevant vendor as part of extrinsic data 708), atmospheric conditions within the plant at the time of the product's manufacture, detected operator or maintenance errors, or other such aspects of the production.

Some embodiments of the manufacturing cloud system 302 can also perform predictive analysis on the customer's real-time and historical data 704, and the scheduling component 310 can dynamically modify the manufacturing process or schedules 702 in a manner inferred to optimize profitability based on results of this predictive analysis. This can include predicting specific manufacturing issues or problems based on analysis of the customer's operational data 704 together with relevant subsets of extrinsic data 708. For example, the analytics component 308 can infer the future outcome of a manufacturing process based on detected events that occurred upstream or downstream from the process. The analytics component 308 may also predict that a particular manufacturing task will fail to complete based on a determination that a supplier entity will not have the necessary inventory to complete the task. Other types of predictions that can be determined by the analytics component 308 based on analysis of the customer's real-time data 704 and extrinsic data 708 can include, but are not limited to, expected machine downtimes, predicted machine component failures, an expectation that a pending order for a product will not be fulfilled within a required time, a predicted time of completion of a manufacturing process, or other such predictions.

Since some of the extrinsic data 708 available to the system 302 includes information regarding industrial regulatory standards, some embodiments of the analytics component can also generate and deliver (via user interface 404) proactive recommendations for staying within compliance of relevant regulatory standards that govern a customer's industrial vertical or enterprise. The system 302 can also update documentation or schedules 702 in accordance with the requirements defined by these regulator standards.

The manufacturing cloud system can also maintain close integration of a customer's machine (OT) data and IT data to yield insights that would not otherwise be observable. For example, analytics component 308 can aggregate plant floor data 704 generated by industrial assets (e.g., temperature data, vibration data, etc.) with MES data that defines what the industrial customer wants those assets to do (the current type of product being manufactured by the assets, the operators schedule to run the assets, etc.), and learn correlations or insights based on this aggregation. In general, the reliability of this and other types of decision-making analysis is dependent on data quality, which can be impacted by presence of outlier values, improper data entries, or other such issues. Typically, manual effort is required to maintain sufficiently error-free data for decision-making analysis (e.g., correction of inaccurate addresses, removal of outlier data, correction of data entry or scanning issues, etc.). In some embodiments, the analytics component 308 can learn the types of data corrections that are typically applied to a customer's various data streams over time, and subsequently make these corrections to the data 704 automatically without the need for human intervention prior to storage as part of the multi-tenant data 706.

Some embodiments of the manufacturing cloud system 302 can also leverage recorded customer data 704, alone or together with the multi-tenant data 706 collected from multiple customers, to assist with operator training. For example, the system 302 can use data models to capture, as part of customer data 704, existing knowledge from trained production line operators regarding workflows for interacting with the production line to yield a baseline level of performance quality. This baseline level of performance quality can be represented by one or more production metrics, such as a maximum amount of machine downtime, a minimum amount of product throughput, a maximum cycle time for machines that make up the line, or other such metrics. The experienced operator's workflow for achieving these desired performance metrics can be captured by the system 302 as part of OT data 704. This data 704 can record, for example, the times within a machine cycle at which the operator performs certain interactions with the production line (e.g., interactions performed via the line's control panel devices, such as switching between operating modes, initiating control sequences, addressing and clearing alarm conditions, etc.), timings between the operator's interactions with the line, the operator's typical machine settings during respective operating modes, or other such aspects of the operator's workflow. The analytics component 308 can record this operator knowledge data as part of the multi-tenant data 706. Subsequently, the user interface component 304 can present this knowledge to a new operator (e.g., via a suitable user interface 404, or as an augmented reality presentation rendered on the operator's client device) to train the new operator regarding best practices for operating the production line. Individual operator skills can also be tracked in this manner, and the analytics component 308 can update work schedules for the production line based on determinations of which operators are best suited for specific tasks.

The manufacturing cloud system's multi-tenant SaaS platform integrates all customer data 706 into a common database (or distributed database), which opens the possibility of providing insights regarding a customer's manufacturing and business operations based on analysis of aggregated multi-tenant data 706 collected from other customers' enterprises. For example, for an industrial customer that operates a particular type of manufacturing process using a specific set of industrial devices and machines, the analytics component 308 can identify subsets of the multi-tenant data 706 collected or generated for other industrial customers that use similar industrial assets to execute a similar manufacturing process (or to manufacture a similar type of product), and can generate recommendations or insights for the industrial customer based on analysis performed on this subset of the data 706. Example types of manufacturing processes that can be used as the basis for this type of data grouping and analysis can include, but are not limited to, types of batch processes used to produce a specific type of material, sheet metal stamping processes, web tension control processes, types of die casting processes, types of machining or tooling processes, or other such manufacturing processes. This type of analysis can be used to learn operating or business strategies that correlate with optimal outcomes of respective different business metrics (e.g., product throughput, profitability, production costs, energy consumption, demand fulfillment, etc.), and generate recommendations and insights that align with these strategies. Based on this type of analysis, the system 302 can, for example, generate recommended system configurations for a customer's industrial assets (e.g., recommended motor drive settings, recommended control code for execution on an industrial controller 118 that monitors and controls an industrial process, recommended data collection configurations, etc.), generate results of shared failure mode effects analysis, determine shared benchmarks and models, predict future sales of a product manufactured by the customer, or generate other such insights or configurations. The system 302 can present these recommendations and insights via user interface 404 or, if appropriate, automatically reconfigure the customer's industrial devices (using configuration data 712) to implement the recommendations (e.g., by setting the configuration parameters of an industrial device in accordance with recommended settings, modifying the control code executing on an industrial controller 118 in accordance with recommended control code, etc.).

Using this multi-tenant analytic approach, the manufacturing cloud system 302 can also identify problems within a given customer's manufacturing and business operations based on a crowdsourcing-type analysis performed on the customer's data 704 together with the multi-tenant data 706 collected and maintained for multiple industrial customers, thereby leverage the multi-tenant nature of the service platform to recognize and correct issues for individual customers. In an example scenario, when assessing a manufacturing process being performed at a given industrial customer's facility, the analytics component 308 can perform machine learning or AI analysis on a subset of the multi-tenant data 706 collected for other industrial customers that execute similar manufacturing processes, using a similar architecture of industrial machines or assets, to identify common problems that have arisen in those systems, the causes of those problems, and corresponding corrective measures used to mitigate the issue. This analysis can determine, for example, patterns in certain subsets of the multi-tenant data 706 (e.g., sensor or metered data such as vibration data, changes in machine cycle times or energy consumptions over time, network data traffic patterns, etc.) that typically presage a specific type of problem within the manufacturing process of interest (e.g., a machine or device failure, a reduction in product quality, excessive energy consumption or emissions, etc.). The analytics component 308 can also determine baseline values of various manufacturing performance metrics indicative of normal operations based on this analysis of the multi-tenant data 706. The analytics component 308 can then determine, based on analysis of data 704 collected for the customer being assessed, whether patterns discovered in any corresponding subset of the customer's data 704 is similar to data patterns having a learned correlation to predicted process failures or quality deviations. In response to detecting such an issue, the system 302 can deliver a notification of the issue, as well as a recommended countermeasure for mitigating a risk posed by the issue, via the user interface 404. In some embodiments, the system 302 may also automatically implement a corrective action predicted to mitigate the risk (e.g., modifying a production schedule 702 for the relevant production line, remotely modifying a control sequence for the production line in a manner predicted to reduce or eliminate the identified issue, etc.).

The analytics component 308 can also analyze multi-tenant data 706 for a subset of customers in similar industrial or business markets to predict future sales of a customer's product, and determine a recommended pricing for the product that would substantially optimize profit (or cause profit to satisfy a defined optimization criterion). In addition to using algorithmic approaches to predict sales forecasts, the analytics component 308 can apply machine learning to these approaches, considering such factors as delivery or supply chain delays (as determined from supply chain updates obtained from the extrinsic data 708), factors that impact product quality, or other such factors. The system 302 can use results of this predictive analysis to recommend target inventory levels (for both products manufactured by a customer as well as raw materials required to manufacture the product) for maximizing profitability, recommend machine tooling or operating schedules that are expected to meet the predicted demand, or generate other such recommendations.

The factors analyzed by the analytics component 308 to predict profitability of a product being produced by a customer may shift during manufacturing, and the system 302 can dynamically adjust both the factors being considered as well as the manufacturing process itself (including adjustments to both upstream and downstream processes) in order to maintain substantially optimized product profitability. As part of this profitability analysis, the analytics component 308 can estimate both profitability of a product, as well as potential missed profit due to insufficient production of the product. By factoring profitability, the manufacturing cloud system 302 can optimize production based on profit rather than just throughput.

In general, the manufacturing cloud system 302 can recognize commonalities across related segments of its customer base and use this information to determine modifications to production, employee, or shipping scheduling that would optimize one or more business metrics (e.g., profitability, sales, emissions reduction, product throughput, etc.), recommend inventory levels for component parts or materials that would optimize profitability of a product that uses those components, or approaches for optimizing other aspects of plant and business operation. The system 302 can present these recommendations to a customer via user interface 404, or take automated actions that implement the recommendations (e.g., updating relevant schedules 702, altering a control process within the customer's plant facility, etc.).

Since the system 302 has a view of multiple supply chain entities, the system 302 can support full traceability from material sources to end product. For customers working with many vendors, the system 302 can monitor those vendors and flag issues that may be relevant to business relationships (e.g., human rights violations, regulatory non-compliance, etc.). In some embodiments, the manufacturing cloud system 302 can also provide customers with information regarding how their end customers are using their products. For example, in the case of original equipment manufacturers (OEMs) that are registered customers of the system 302, the system 302 can generate information regarding where their machines are installed, the statuses of the machines, or other such information. By deliver this information to the OEM, the system 302 can streamline the process of feeding back information about degradation of the OEMs' machines.

When a production line at a customer facility is being configured for a new job (e.g., to configure the line to produce a different product in accordance with the production schedules), the manufacturing cloud system 302 can assist operators with equipment setup for the new job by setting recommended device configuration parameters at the schedule time, or by rendering configuration instructions on the user interface 404 that guide operators through the process of configuring the appropriate equipment. As the job is running, the system 302 can collect and analyze data 704 indicative of the job performance or quality of the resulting product, and dynamically adjust the equipment configurations based on this quality analysis to bring one or more quality metrics in line with required baselines.

In some embodiments, the manufacturing cloud system 302 can leverage generative AI to assist the analytics component 308 in performing any of the various types of industrial analytics and services described herein. In such embodiments, a generative AI component 314 can implement prompt engineering functionality using associated trained models 714 trained with various types of training data, and can use these prompt engineering features to interface with a generative AI model 710 and associated neural networks. In various embodiments, the generative AI model 710 can be any of a diffusion model, a variational autoencoder (VAE), a generative adversarial network (GAN), a language-based generative model such as a large language model (LLM), a generative pre-trained transformer (GPT), or other such models.

Figure 8:
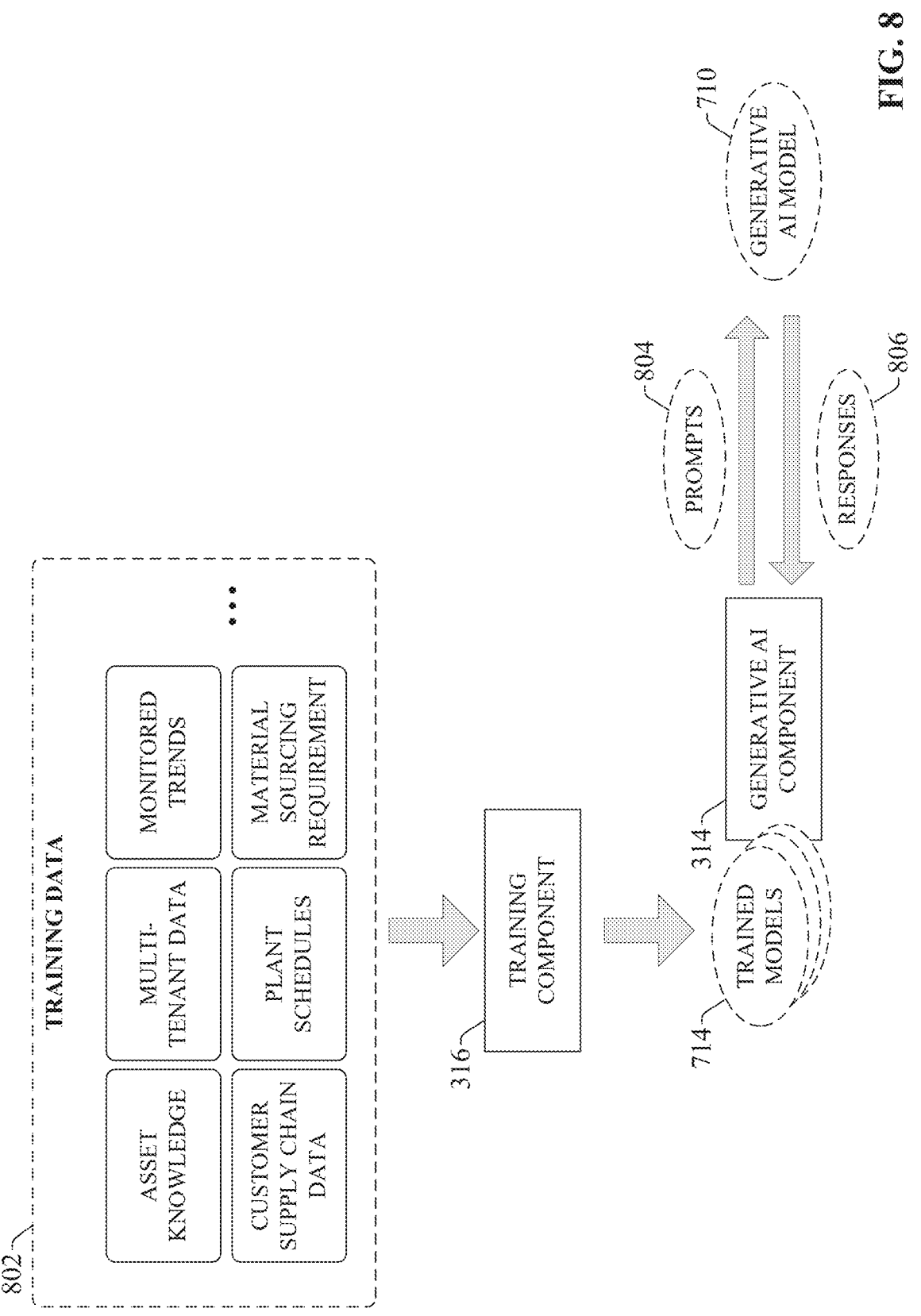
FIG. 8 is a diagram illustrating training of models used by the system's generative AI component.

FIG. 8 is a diagram illustrating training of the models 714 used by the generative AI component 314 in some embodiments. A training component 316 can train models 714 using training data 802 relevant to the types of industrial analytics performed by the manufacturing cloud system 302 (e.g., analysis of supply chain events, modification of production or work schedules to optimize profitability metrics, prediction and correction of manufacturing problems, etc.) Such training data 802 can include, but is not limited to, knowledge or technical specifications of industrial assets, machines, and devices that are in service within the customers' industrial facilities (which can include equipment maintenance manuals); at least some of the multi-tenant data 706 collected from multiple industrial customers; monitored trends in asset operation (e.g., histories and frequencies of asset failure); information about supply chains in which the industrial customers participate (e.g., identities and roles of respective entities in the supply chains; relationships of those entities to the industrial customers, etc.); plant schedules (e.g., production, work, and shipping schedules); help files; vendor knowledgebases; training materials; information defining industrial standards (e.g., global or vertical-specific safety standards, food and drug standards, design standards such as the ISA-88 standard, etc.); technical specifics or design standards for various types of industrial control applications (e.g., batch control processes, die casting, valve control, agitator control, etc.); knowledge of specific industrial verticals; knowledge of industrial best practices; control design rules; or other such data 802. Although FIG. 8 depicts the use of trained models 714, the training data 802 can alternatively be stored in a knowledge base for access by the generative AI component 314 in some embodiments.

In some scenarios, the various types of analytics described above as being performed by the analytics component 308 can be performed without accessing the generative AI model 710 if the analytics component 308 determines that sufficient information can be obtained from the customer's data 704, the multi-tenant data 706, or the trained models 714 in order to reach an analytic result (e.g., identification of a production problem, formulation of a corresponding countermeasure, a revision to a schedule 702 inferred to improve or optimize a business metric, etc.) having a sufficient probability of accuracy. However, if the analytics component 308 determines that supplemental information prompted from the generative AI model 710 will yield an analytic result having a greater likelihood of accuracy (or that this supplemental information will cause the accuracy of the analytic result to exceed a minimum accuracy threshold), the analytics component 308 can instruct the generative AI component 314 to prompt the generative AI model 710 for this supplemental information as part of the analysis.

As part of this analytic process, the generative AI component 314 formulates and submits prompts 804 to the generative AI model 710 designed to obtain responses 806 that assist with these analytics tasks. These prompts 804 are generated based on the type of analytics being performed on the customer's data 704 as well as the knowledge and reference data encoded in the trained models 714. The generative AI component 314 can reference trained models 714 as needed in connection with identifying the type of supplemental information required to assist the analytics component 308 in carrying out the analysis, and formulating a prompt 804 predicted to obtain, from the generative AI model 710, a response 806 that contains the supplemental information.

For example, as the manufacturing cloud system 302 is monitoring a customer's OT or IT data 704 (alone or in conjunction with multi-tenant data 706 as part of a multi-tenant analysis) for potential operational or business concerns requiring a countermeasure, the analytics component 308 can determine whether a given subset of the customer's data 704 generated by an industrial asset or related groups of assets is indicative of a risk condition based on knowledge of the relevant industrial assets (e.g., values of performance indicators known or inferred to correlate with a failure or performance degradation for those specific assets, the nature of the performance problem indicated by anomalous values of those performance indicators, lifecycle information for the assets, etc.), and this asset knowledge can be obtained from technical asset information encoded in the trained models 714 as part of training data 802 or can be prompted from the generative AI model 710 as a generative AI response 806 using suitable prompts 804 generated by the generative AI component 314.

Similarly, when an asset performance problem is detected or predicted, the analytics component 308 can formulate a recommended countermeasure strategy for mitigating the detected problem (e.g., modifying a production or work schedule, obtaining a missing component from an alternative source, modifying a control sequence for a production line, reconfiguring an industrial device, etc.) based on the training data 802 encoded in the models 714, as well as responses 806 prompted from the generative AI model 710. Responses 806 prompted from the generative AI model 710 can also be used by the user interface component 304 to generate natural language content describing the recommended countermeasures to be rendered on the user interface 404 (e.g., natural language descriptions of the discovered issue, natural language descriptions of the maintenance tasks for addressing the issue, etc.). Other types of supplemental information that can be prompted from the generative AI model 710 to assist the analytics component 308 in converging on accurate insights and corrective actions can include, but is not limited to, statuses of specified supply chain entities (e.g., transportation schedules of shipping companies, inventory levels of specified components maintained at warehouse entities, etc.), current weather conditions, industrial device specifications, information regarding consumer demand for a specified type of product, information regarding business relationships between supply chain entities, shipping route information, or other such information.

In the scenarios described above, the analytics component 308 may instruct the generative AI component 314 to prompt the generative AI model 710 for supplemental information in response to determining that additional information from the generative AI model 710 would yield an analytic result having a higher probable level of accuracy relative to relying solely on the customer data 704, multi-tenant data 706, and trained models 714 alone. The generative AI component 314 can generate the prompt 804 to include any relevant information that can assist the generative AI model 710 in converging on a useful response 806 that can be used to better understand a current context of a customer's manufacturing and business operations, including but not limited to a selected subset of the multi-tenant data 706; an identity, name, or description of the industrial asset of interest (e.g., a name or type of machine or industrial device), an indication of the type of industrial process or application being carried out by the industrial asset of interest (e.g., a specific type of batch processing, a specific automotive manufacturing function, a sheet metal stamping application, etc.), any selected subsets of the training data 802, or other such data.

Some trained models 714 may be global models that are referenced by the manufacturing cloud system 302 in connection with providing services to any industrial customer subscribed to access and use the manufacturing cloud system 302. These global trained models 714 can be trained with training data 802 that is globally applicable to all customers (e.g., technical information for industrial assets, industrial standards, etc.). In addition to these global trained models 714, a given industrial customer or enterprise may also be allocated one or more custom trained models 714 that are trained using proprietary training data 802 provided by, or collected from, that customer. This customer-specific training data 802 can include information regarding the industrial assets or applications operated by the customer (including the types of products manufactured by the customer, the industrial devices and assets used to manufacture these products, and the functional relationships between these assets), information regarding the locations and functions of the customer's industrial facilities, the customer's production schedules, information regarding supply chain entities within the supply chains in which the customer operates (e.g., shipping companies, companies that source component parts or materials for the customer, warehouse entities, retail entities that sell the customer's product, etc.), monitored trends in the behavior of the customer's industrial assets or machines, the customer's part or material sourcing requirements, information regarding the customer's employees (e.g., identities, roles, work schedules, training and certifications, etc.), information regarding material sourcing requirements for the customer's manufacturing processes (e.g., identities and quantities of component parts or materials required to manufacture the customer's products), or other such customer-specific information. The generative AI component 314 can reference these customer-specific trained models 714, in addition to the global models 714, in connection with providing any of the services described herein (e.g., dynamic scheduling, formulating recommendations for addressing a discovered or predicted manufacturing or business problem, etc.)

Using this architecture, the scheduling features described above as being implemented by the scheduling component 310 (based on results generated by the analytics component 308) can be enhanced using generative AI. For example, the analytics component 308 and scheduling component 310 can optimize a customer's schedules 702 based on learned skill sets of employees, determinations of what times of day the respective employees perform their most effective work, employee availabilities (factoring work schedules, meeting schedules, or other employee schedules), and other such factors. In the case of determining a given employee's most effective working hours, the analytics component 308 can monitor, as part of data 704, selected machine operating metrics that are known to be at least partially dependent on a human operator's skill or effective handling of the machine, and correlate the quality of these monitored metrics for respective time periods with the identities of the operators who are scheduled to work on the machine during those periods. Based on these learned correlations, the analytics component 308 can learn correlations between specific operator tasks and the operators who are most effective at performing those tasks, and the scheduling component 310 can modify the customer's operator work schedules 702 based on this information to optimize the machine operating metrics.

In some embodiments, the manufacturing cloud system 302 can also perform financial and security audits using generative AI. In such embodiments, the analytics component 308, assisted by responses 806 prompted from the generative AI model 710 by the generative AI component 314, can execute audits on the customer's data 704 based on rules and system configurations.

Some embodiments of the system 302 can also perform supply chain forecasting analysis and, based on this analysis, formulate supply chain planning recommendations and schedules designed to optimize one or more business metrics given constraints of the forecasted state of the supply chain. In such embodiments, a given customer's custom trained models 714 can be trained on the customer's material or component sourcing requirements, supply chain partners (e.g., shipping entities, warehouse entities, supplier entities, retail entities, etc.), and other such information regarding the customer's supply chain relationships and requirements. The analytics component 308 can use this information, together with real-time status and planning data collected from these various supply chain entities on a substantially real-time basis (as part of extrinsic data 708) to formulate planning or scheduling recommendations that are predicted to improve or optimize one or more business metrics specified by the customer within the constraints of the predicted supply chain conditions. These business metrics can include, but are not limited to, profitability, production costs, demand fulfillment, achieving a defined budgetary goal, achieving a minimum product quality, or other such metrics. Factors that can be considered by the analytics component 308 in optimizing these metrics can include, but are not limited to, current or forecasted availability or costs of a supplier entity's components or materials required by the customer for manufacture of a product, a shipping entity's transportation schedules, a current or forecasted demand for a product manufactured by the customer, current or scheduled capacity constraints on the customer's production lines, the customer's budgetary information, any discovered supply chain disruptions, or other such factors.

Based on results of this supply chain planning analysis, the manufacturing cloud system 302 can assist the customer in planning their operations, orders, inventories, and schedules to improve or optimize the specified business metrics. For example, the scheduling component 310 can dynamically adjust any relevant schedules 702 (e.g., production schedules, shipping schedules, etc.), orders for component parts or materials, inventory schedules defining inventory levels of component parts or finished products to be maintained, or other planning materials in to align with the optimization strategy formulated by the analytics component 308. In addition or as an alternative to these dynamic modifications, the system 302 can also render, on user interface 404, recommendations for implementing any of the scheduling or planning strategies, together with a description of the reasons for the modifications and the expected benefits of the proposed plan.

As in previous examples, the analytics component 308 can, as needed, enhance the data used to perform this supply chain planning analysis (extrinsic data 708, multi-tenant data 706, the customer's OT and IT data 704 together with their proprietary trained models 714) using responses 806 prompted from the generative AI model 710 by the generative AI component 314. For example, as part of the supply chain planning analysis, the generative AI component 314 may formulate prompts 804 designed to obtain responses 806 from the generative AI model 710 comprising information about industrial asset capabilities, current or predicted consumer demand for a product or type of product manufactured by the customer, sales statistics for the product, status information for a specified supply chain entity on which the customer depends (e.g., service disruptions or service outages), information regarding alternative sources of a component part or material required to manufacture a product manufactured by the customer, or other such responses 806. The analytics component 308 can incorporate the information provided by these responses 806 into the supply chain planning analysis described above.

To alleviate the need for an administrator of the manufacturing cloud system 302 to customize the system's data collection, analysis, and reporting services for individual customers' needs, and to afford customers the ability to tailor the system's service to their particular assets and business needs, some embodiments of the system 302 can offer a variety of extensibility tools to partners and customers, allowing those users to customize or extend the system's capabilities to suite their unique needs. This not only affords users a degree of flexibility in customizing their cloud-based manufacturing applications, but also alleviates the burden on administrators of the system 302 to develop custom solutions for individual customers.

Figure 9:
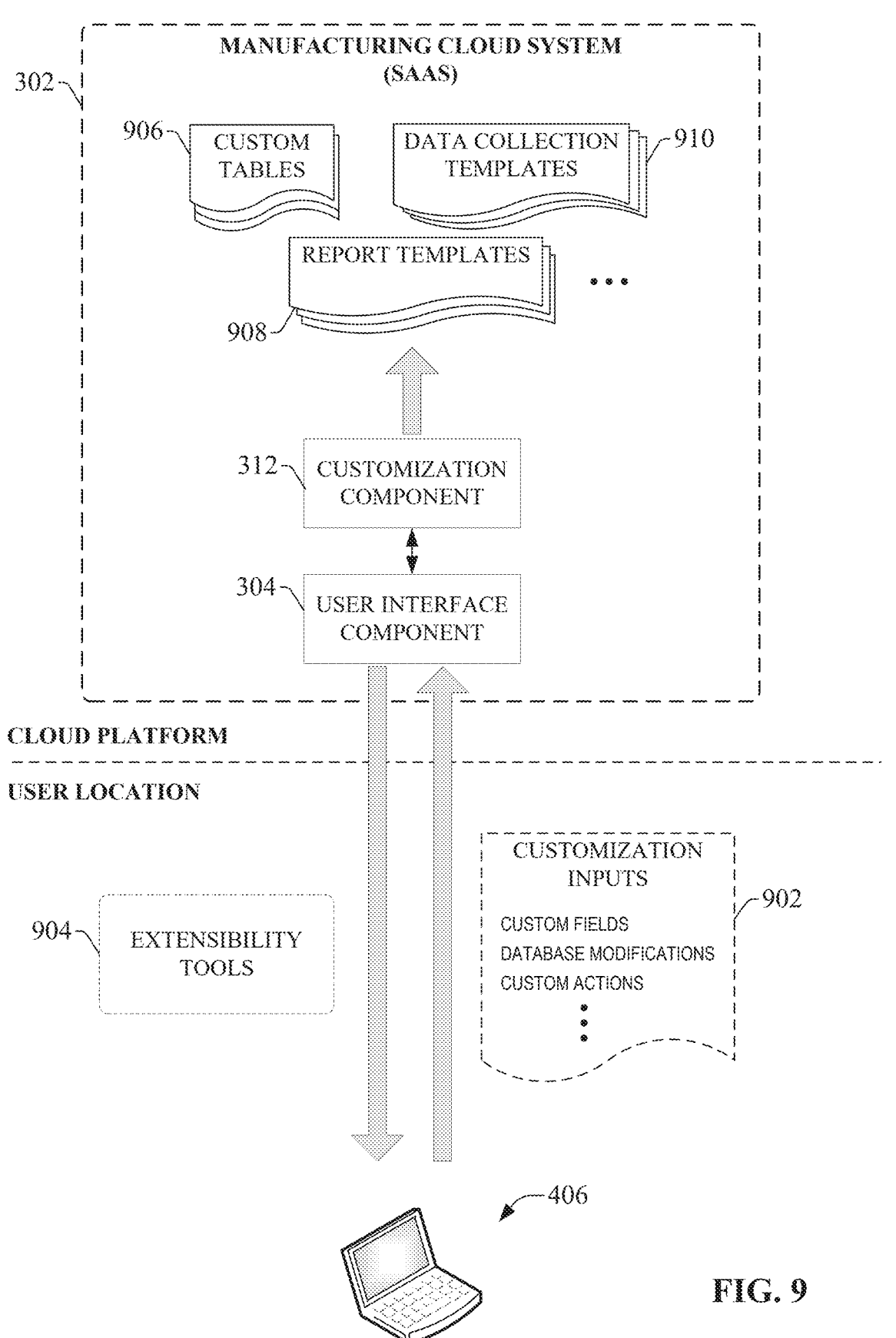
FIG. 9 is a diagram illustrating the use of the manufacturing cloud system's extensibility tools to create customized data collection templates, report templates, and data tables.

FIG. 9 is a diagram illustrating the use of the manufacturing cloud system's extensibility tools 904 to create customized data collection templates, report templates, and data tables. In general, extensibility refers to the use of existing services and tools 904 to enable customers of the system 302 to define customer-specific uses, customize behaviors, and provide new cloud-based manufacturing planning solutions, allowing the system 302 to grow beyond planned product roadmaps and to be used in industrial verticals that may not have been reachable using the system's default services. The system's customization component 312 can render these extensibility tools 904 accessible to customers via suitable customization interfaces (delivered to the customers' client devices 406 by user interface component 304). Through interaction with these extensibility tools, customers can submit customization inputs 902 that define modifications or customizations to an existing service offered by the manufacturing cloud system 302. The customization component 312 can implement the requested customizations on the system 302 based on these customization inputs 902 and render the resulting customized service available exclusively to the industrial customer that submitted the customization requests while leaving the system's default services available for use by other customers. That is, customization of a service by a customer yields a new customized instance of the service that is exclusive to the customer (that is, on that customer's SaaS tenant).

As an example customization, the extensibility tools 904 can be used by the customers to customize their data collection templates 910 to specify which items of their OT or IT data 704 are to be collected, stored, and analyzed by the system 302. The customer can also use the extensibility tools 904 to modify or create customized databases or tables for storage of their data 704. In some cases, the customizations implemented by a customer using the extensibility tools 904 may be motivated by requirements specific to the industrial vertical in which the customer operates For example, an automotive enterprise may require collection of certain types of information for warranty claim purposes, and the manufacturing cloud system's default data collection services may not be designed to collect this data. Accordingly, the customer can use the extensibility tools 904 dynamically add data fields corresponding to the required items of data 704 to existing data collection templates 910 and modify databases or tables 906 as needed to collect the required data. Based on these customer modifications, the customization component 312 will configure the customer's tenant-specific instance of the system's data collection services to collect the specified data items, and the process or report this data as indicated by the customer's customization inputs 902. In another example, a customer may require certain information to be included on a shipping label generated by a shipping label printing application, and can use the extensibility tools 904 to customize the system's existing data collection templates 910 to collect the necessary data and to use this data in the shipping label application.

Users can also use the extensibility tools 904 to define custom fields on user interfaces 404 or in APIs, or to create custom programming objects. In another example use case, a customer may use the tools 904 to configure the system's data collection services to collect advanced product usage data points on a product return under a return merchandise authorization. As another example, the manufacturing cloud system 302 may support an accounts receivable tracking service and associated display screens and reports for displaying accounts receivable information. A customer can use the extensibility tools 904 to customize this service to display and filter the latest accounts receivable collection attempt date on the standard accounts receivable aging screens and reports. In another example customization, a customer may configure the data collection services to collect and store external employee identifiers from human resource systems via customized APIs.

Users can also use the extensibility tools 904 to create custom actions to be performed by the system 302, including event-driven, time-driven, or screen-driven action flows. In a supply chain management example, a customer can use the extensibility tools 904 to define a custom event whereby a "Review" status is automatically assigned to a shipper in response to detecting an overweight condition for the shipper. In another example, the extensibility tools 904 can be used to define a trigger for a multi-step workflow request in response to detecting that an end customer is over their credit limit, or to define a workflow whereby the carbon footprint of shipping containers is tracked by the system 302 as those containers flow from vendors and work centers.

Users can also use the extensibility tools 904 to create custom applications to be executed by the system 302, including customer-authored applications, partner-authored applications, or applications generated using native development tools supported by the system 302. This can include, for example, defining a new functionality to be added to an existing application already available on the system 302, and adding new buttons or another type of control to the application's interface to trigger this new user-defined functionality. The customizatoin component 312 implements these customizations based on the user's customization input 902, and the system 302 makes the resulting modified application and associated custom interfaces accessible exclusively through the SaaS tenant of the customer that defines the customizations. In another example, the tools 904 can be used to initiate a process inside or outside of the manufacturing cloud system 302 in response to detection of a specified event defined by the customization input 902 (e.g., addition of a new part). The manufacturing cloud system 302 may also allow partners to make their resulting custom applications available on a marketplace, allowing their customers to import these custom applications into their SaaS tenant.

In some embodiments, tools 904 used to build custom applications may provide a what-you-see-is-what-you-get (WYSIWYG) interface for building or modifying interface displays and defining their underlying functionality. An example extensibility interface can guide the customer through a process of graphically connecting objects or items of functionality, connecting steps (e.g., performing an action, talking to the system's backend database), selecting tables to communicate with, defining a workflow, or other customization functions to yield a customized application.

Some embodiments of the customization component 312 can also be configured to perform customer- and context-specific customizations dynamically based on detected real-time contextual factors. For example, if the customer is viewing a dashboard generated by the system 302 for rendering information about the customer's manufacturing process or supply chain conditions, the customization component 312 can dynamically optimize the layout of graphics and information on the dashboard based on conditions of the current situation (e.g., a current operating scenario, the customer's current focus of attention, etc.).

Figure 10:
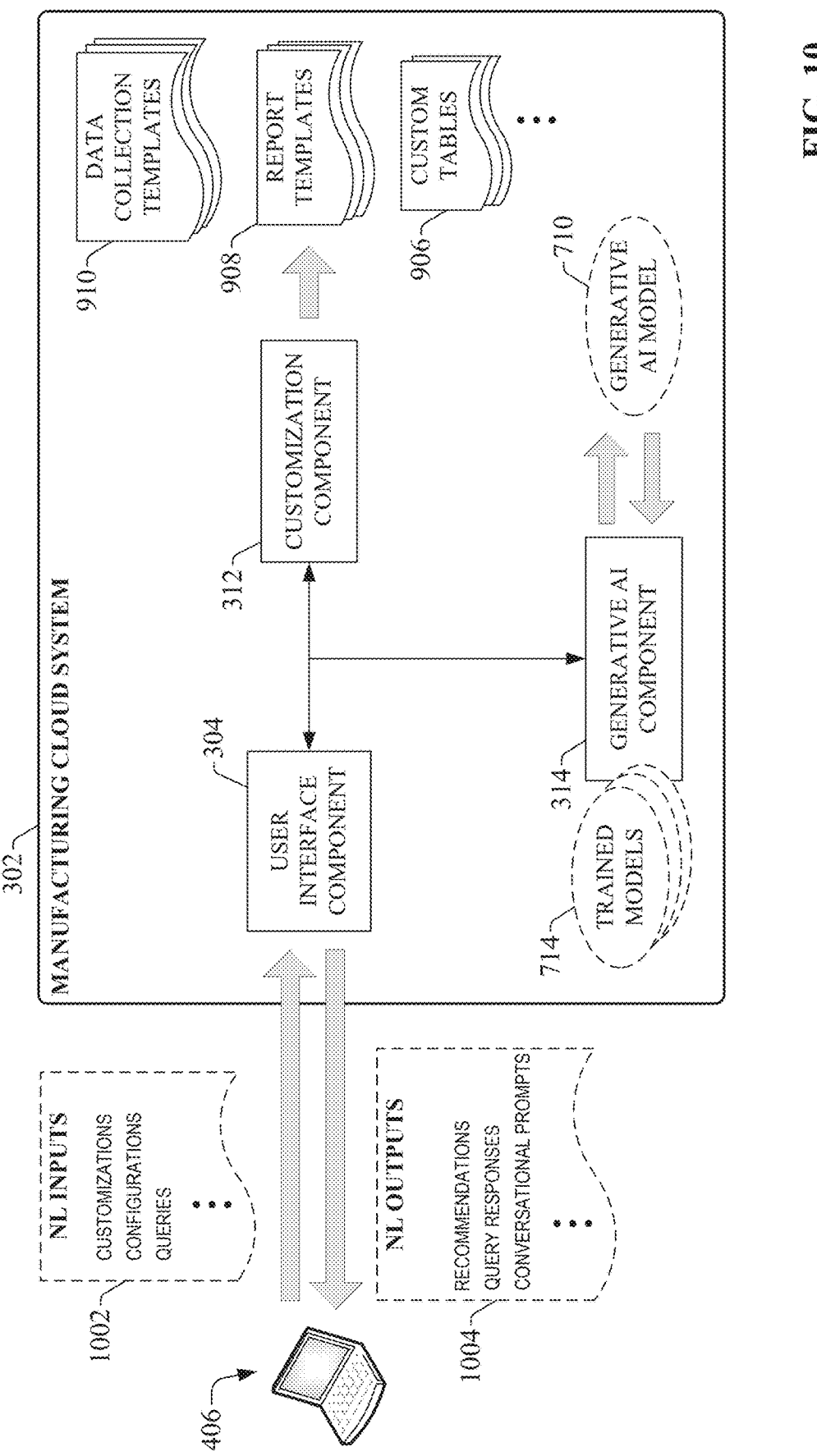
FIG. 10 is a diagram illustrating exchange of natural language communications between a user and the system to implement customer-specific customizations.

To render these customization workflows more intuitive to the customer, some embodiments of the extensibility tools 904 can incorporate a generative AI-assisted chat interface that engages in a natural language dialog with the customer as an alternative to explicit customization inputs 902. FIG. 10 is a diagram illustrating exchange of natural language communications between a user and the system 302 to implement customer-specific customizations, or to perform other functions. Embodiments of the manufacturing cloud system 302 that support generative AI-based chat interactions can render, on a customer's client device 406 (via user interface component 304), a chat interface through which a user can exchange natural language (NL) prompts or chat conversations with the system 302. This chat interface can include a data entry field for entering a user's NL inputs 1002 as a text string, or can support other input formats for a user's NL inputs 1002 (e.g., spoken-word audio input).

In general, the manufacturing cloud system 302 can receive and process a user's NL inputs 1002, which can comprise requests for customizations to existing or default services offered by the system 302, descriptions of the functional requirements that the customizations are intended to address, questions regarding the customer's manufacturing or business operations, or other such prompts. The system 302 can use the prompt engineering services implemented by the generative AI component 314 to process the NL inputs 1002 submitted by the user via the chat interface (or via a spoken word interface). These prompt engineering services can leverage knowledge encoded in the trained modules 714 (as learned from training data 802), together with responses 806 prompted from the generative AI model 710, to accurately ascertain the user's needs and respond to the user's NL inputs 1002.

In the case of customizing the system's services as described above in connection with FIG. 9, the customization component 312 can render, as a natural language output 1004 via user interface component 304, questions that prompt the customer for information that can be used by the customization component 312 to infer the customer's functional needs and to implement customizations predicted to address those needs. These questions can prompt the user for information regarding the customer's market or industrial vertical, descriptions of the customer's business goals, descriptions of custom actions that the customer wishes to implement, an indication of an industrial asset from which a new data item is to be collected, or other information that can be used to infer suitable customizations to the manufacturing cloud services predicted to satisfy the customer's requirements.

After submission of the customer's initial input 1002 requesting a customization to one of the system's services, if the customization component 312 determines that additional information from the customer would yield customizations having a higher probability of satisfying the user's initial request relative to relying solely on the initial input 1002 (that is, a determination that additional information from the customer is necessary in order to yield a customization having a probability of satisfying the user's needs that exceeds a defined threshold probability), the customization component 312, assisted by the generative AI component 314, can formulate and render additional natural language outputs 1004 that prompt the user for more refined information that will allow the customization component 312 to implement suitable customizations likely to address the customer's needs. The customization component 312, assisted by the generative AI component 314, can drive an iterative natural language dialog with the user in this manner until sufficient information has been prompted from the customer to allow the customization component 312 to implement a set of customizations having a sufficiently high probability of accurately addressing the customer's requirements.

At any time during this iterative dialog, the generative AI component 314 can, if necessary, formulate and submit prompts 804 to the generative AI model 710 designed to obtain responses 806 from the generative AI model 710 comprising information that can either assist the customization component 312 in determining the customer's requirements from the natural language inputs 1002 or assist the generative AI component 314 in determining suitable follow-up questions to present to the user that are designed to prompt the user for clarifying information regarding the requested customizations. For example, in response to receipt of a natural language input 1002 requesting a customization to the system's services, the generative AI component 314 can determine whether a sufficiently accurate customization can be formulated based on information inferred from the input 1002 together with relevant information contained in the trained models 714 alone, or, alternatively, whether supplemental information from the generative AI model 710 is necessary to either formulate a customization having a sufficiently high probability of satisfying the customer's request, or to formulate a follow-up question designed to prompt the user for additional information that can be used by the customization component 312 to yield an accurate customization. If supplemental information from the generative AI model 710 is deemed necessary, the generative AI component 314 can formulate prompts 804 based on analysis of the original NL input 1002 and the industrial knowledge encoded in the trained models 714. For example, as part of this iterative dialog with the customer, the generative AI component 314 may formulate prompts 804 designed to obtain responses 806 from the generative AI model 710 comprising information about data items that are available in specific models of industrial devices or machines (which may be relevant to determining which of the available data items should be added to a data collection template to satisfy the customer's request), information about reporting or auditing requirements for specific types of industrial verticals (which may be required to determine an appropriate customized data collection and reporting strategy that will comply with prevailing standards), or other such information.

The customization component 312 can use the information prompted from the customer and, if necessary, information from the trained models 714 or responses 806 prompted from the generative AI model 710, to ascertain a set of functional requirements and to formulate customizations determined to satisfy these requirements. These customizations may include any of the customizations described above in connection with FIG. 9 (e.g., customizations to data collection templates 910, tables 906, report templates 908, user interfaces 404, custom actions or schemas, etc.). According to an example customization, the user may submit, as an NL input 1002, a description of a new item of OT data 704 (a telemetry value generated by a sensor, a data tag value generated by an industrial controller, etc.) to be collected by the system 302 for reporting or analytic purposes. Based on analysis of this input 1002, the generative AI component 314 and customization input 902 can determine which data collection templates 910, tables 906, or report templates 908 should be updated to accommodate collection of the specified data item, and implement the necessary changes on the customer's tenant-specific instances of those templates and tables.

The generative AI component 314 can assist with designing these customizations by formulating and rendering the natural language questions designed to prompt the customer for necessary information, leveraging generative AI infer the customer's needs from the customer's natural language inputs 1002, or performing other generative AI-assisted functions. Based on iterative natural language interactions between the customer and the system 302, the customization component 312 and generative AI component 314 can converge on customization strategies that align with the user's needs at a high level of confidence. For example, after receiving an initial input 1002 requesting a customization the generative AI component 314 can, if necessary, prompt the customer for additional information about the initial request by formulating, as NL outputs 1004, questions designed to obtain the additional information (e.g., questions regarding the reason that a new data item is being collected, questions asking which reports should include the new data item, questions asking a frequency at which the data item should be collected, etc.). The customization component 312 will then generate the resulting customizations based on this additional information.

The accuracy of the system's generative AI—particularly within the context of industrial services and customizations to those services—is enhanced by the range of domain-specific multi-tenant data 706 available on the platform, which is used to train the models 714 used by the generative AI component 314. As noted above, these trained models 714 are referenced by the generative AI component 314 in connection with formulating prompts 804 that are designed to obtain responses 806 from the generative AI model 710 that assist the customization component 312 in ascertaining the customer's needs and formulating a suitable customization of the system's services for use by the customer.

In addition to using generative AI to support extensibility of the system's functions, some embodiments of the manufacturing cloud system 302 can also support the use generative AI to perform other system functions. For example, the generative AI component 314 can allow users to implement no-code configurations on their personalized user interfaces 404 or reports using natural language inputs 1002 describing the nature of the requested configurations. This can include, for example, applying generative AI to assist with drag-and-drop interface configurations (e.g., by describing graphical items to be added or removed from an interface 404, the location on the interface 404 at which a new or existing graphical item should be placed, a data item to be used to animate or populate a specified graphical item, etc.). This can assist users without manufacturing knowledge to create these configurations based on natural language descriptions of functional requirements. Generative AI can also be used to perform user interactions with any of the user interfaces 404 generated by the system 302. For example, users can submit natural language inputs 1002 describing desired interactions with an interface's controls (e.g., check boxes, data fields, etc.), and the generative AI component 314 can perform the interactions relative to the interface 404 based on analysis of these inputs 1002.

Natural language inputs 1002 can also be used to submit queries about a customer's manufacturing operations, business conditions, or supply chain conditions. The generative AI component 314 and analytics component 308 can process these inputs 1002 and, in response, generate answers to these queries as natural language outputs 1004 based on analysis of any of the initial query, the multi-tenant data 706, extrinsic data 708, trained models 714, and responses 806 prompted from the generative AI model 710.

The generative AI component 314 can use a range of approaches for processing a natural language input 1002 submitted by a customer, and for formulating prompts 804 to the generative AI model 710 designed to yield responses 806 that assist in responding to the customer's request or query as represented by the input 1002. According to an example approach, the manufacturing cloud system 302 can maintain an archive of chat exchanges or dialogs between the manufacturing cloud system 302 and other customers. The generative AI component 314 can access this chat archive and identify a subset of these archived chat sessions that were initiated by customer queries having similarities to the initial NL input 1002 submitted by the present customer. Upon identifying these archived chat sessions, the generative AI component 314 can analyze these past chat sessions to determine types of customizations or responses that were ultimately generated by the system 302 as a result of these sessions (e.g., customizations that were implemented to address a similar requirement or business need to that described by the customer's NL input 1002, types of information provided as an NL output 1004 in response to similar queries submitted as NL inputs 1002, etc.), and generate a customization or other type of response based on the outcomes of these past chat sessions and adapted to the customer's specific business or industrial assets.

Analysis of these archived chat sessions, as well as any other relevant customer-specific knowledge or expertise encoded in the trained models 714, can also assist the generative AI component 314 in inferring the user's needs from an initially vaguely worded NL input 1002, and to formulate a suitable customization addressing these needs. If supplemental information from the generative AI model 710 is deemed necessary to formulate a customization (or a response formatted as an NL output 1004) having a sufficiently high probability of satisfying the user's request, the generative AI component 314 can also formulate a prompt 804 designed to prompt the generative AI model 710 for at least a portion of the supplemental information. This may include, for example, formulating the prompt 804 to request, from the generative AI model 710, information that may not have been specified in the user's NL input 1002 but which the generative AI component 314 has ascertained to be necessary to accurately respond to the customer's request or query (or to implement a desired customization of the system's services). In this way, the generative AI component 314 and its associated trained models 714 can actively frame a customer's natural language input 1002 in a manner that quickly and accurately leads the generative AI model 710 to the customer's desired results.

In another example approach, the generative AI component 314 can enhance a customer's natural language input 1002 (e.g., a query or customization request) with additional information from the trained models 714 (or the training data 802 used to train the models 714) that contextualizes the user's request, and integrate this additional information with the customer's NL input 1002 to yield the prompt 804 submitted to the generative AI model 710. The types of additional contextual information added to the customer's NL input 1002 can depend on the nature of the query represented by the input 1002 and can include, but is not limited to, technical information about an industrial asset known to be relevant to the customer's query, information regarding monitored operational trends in an industrial asset of interest, or other such information.

In some embodiments, generative AI can also be used to specify the customer's business goals of interest that are to be optimized using the multi-tenant optimization analysis described above in connection with FIG. 7. In such embodiments, the customer can submit, as an NL input 1002, a natural language description of a business goal—e.g., maximization of overall profit, maximization of profit for a specified product, maximization of product throughput for a specified product to be given priority over other products, fulfilment of overall demand or demand for a specific product, minimization of energy consumption or emissions, maintaining an acceptable level of product quality, etc.—that the customer wishes the manufacturing cloud system to optimize. As in examples described above, the generative AI component 314 can, if necessary, drive an iterative natural language dialog with the customer to prompt additional information about the business goal from the customer if the customer's initial NL input 1002 does not convey the nature of the desired business goal with a sufficient degree of clarity, or if additional information from the customer would allow the system 302 to satisfy the request with a sufficiently high degree of confidence. The generative AI component 314 can process the customer's NL input 1002 (and any additional responses prompted from the customer) to determine the requirements of the customer's desired business goal, and provide this information to the analytics component 308 as a parameter for the multi-tenant optimization analysis.

FIGS. 11-14 illustrate various methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 11 illustrates an example methodology 1100 for dynamically modifying an industrial enterprise's production, shipping, or inventory schedules using a global, multi-tenant manufacturing cloud system that executes as an SaaS on a cloud platform and provides industrial services to multiple customers. Initially, at 1102, data from multiple industrial customers is collected and stored by the manufacturing cloud system. The industrial customers can be different industrial enterprises (including different plant facilities that make up an enterprise), entities of a supply chain (e.g., suppliers, manufacturers, shipping entities, warehouse entities, distributors, etc.), or other such industrial customers. The collected data can include both OT data relating to production processes within a plant facility (e.g., data collected from industrial monitoring and control devices associated with automation systems, work schedules, production schedules, work order data, inventory levels of various parts or materials, or other such production information) as well as selected sets of IT data collected from the customer's business-level systems (e.g., HR information, purchase order data, or other such information).

At 1104, a determination is made, based on analysis of the multi-tenant data collected at step 1102, as to whether a current condition of a supply chain necessitates a modification to an industrial customer's production schedule, shipping schedule, inventory schedule, or purchase order in order to optimize a defined business metric. The business metric can be, for example, maximization of the customer's overall profit, maximization of profit for a specified product manufactured by the customer, maximization of product throughput for a specified product (e.g., a product specified as being given priority over other products), fulfilment of overall demand or demand for a specific product, minimization of energy consumption or emissions, maintaining or exceeding a minimum level of product quality, or other such metrics. The detected supply chain condition that may necessitate a modification to the customer's planned operations may comprise, for example, a supply chain disruption that may affect the availability of a product or material required by the customer to manufacture a given product, a disruption in the distribution chain that will impact the timing of delivery of the customer's products to retail entities, or other such conditions.

At 1106, if it is determined that a change to the customer's business or manufacturing operations is necessary in order to optimize the business metric given the current or predicted supply chain condition (YES at step 1106), the methodology proceeds to step 1108, where a modification to one or more of the customer's production schedules, shipping schedules, inventory schedules, or purchase orders is formulated, where the modification is predicted to optimize or substantially optimize the business metric, taking into consideration the current condition of the supply chain. Examples of such modifications can include, but are not limited to, modifying a production schedule to change the product to be manufactured by a production line from an originally scheduled product to a different product; changing a purchase order for a specified component part or material to alter the source from which the part or material is purchased; changing a scheduled level of inventory for a component part, material, or manufactured product; altering a shipping schedule to ship an incomplete product or to defer shipment of a product; or other such modifications to business or manufacturing operations.

At 1110, the modification to the production schedule, shipping schedule, inventory schedule, or purchase order is implemented by the manufacturing cloud system. In some embodiments, the manufacturing cloud system may also dynamically alter the programming or configurations of industrial assets on the plant floor in accordance with the modification formulated at step 1108. This can include, for example, modifying a control sequence of an industrial controller (e.g., changing the control code executed by the controller, instructing the controller to execute a different control routine corresponding to a different product, modifying a control setpoint, modifying a speed of operations, etc.), modifying device configuration parameters of an industrial device (e.g., an operating mode, a scale factor, etc.), or implementing other such changes to plant floor operations.

Figure 12:
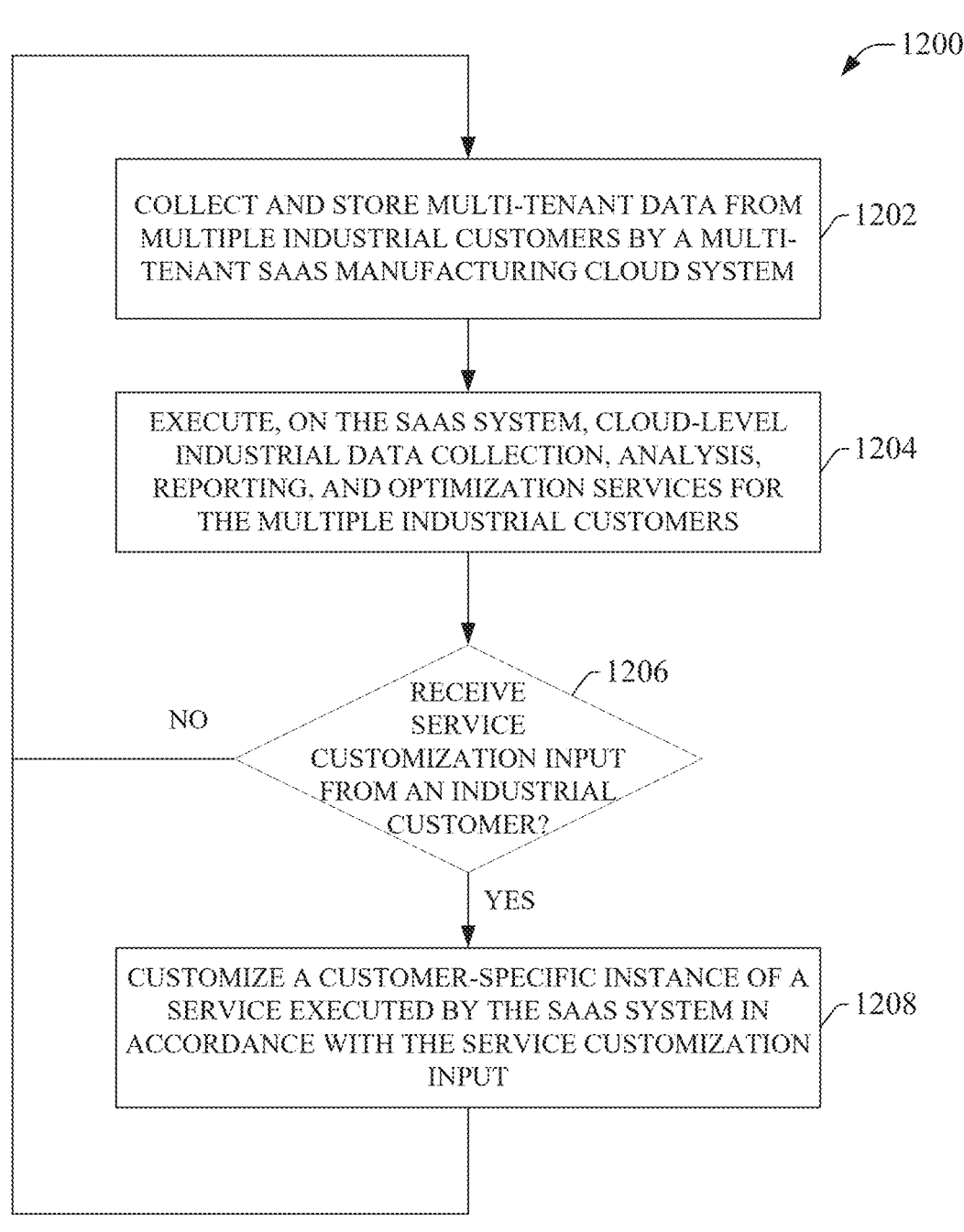
FIG. 12 is a flowchart of an example methodology for customizing cloud-based manufacturing services for individual industrial customers registered as tenants of a manufacturing cloud system.
Figure 13B:
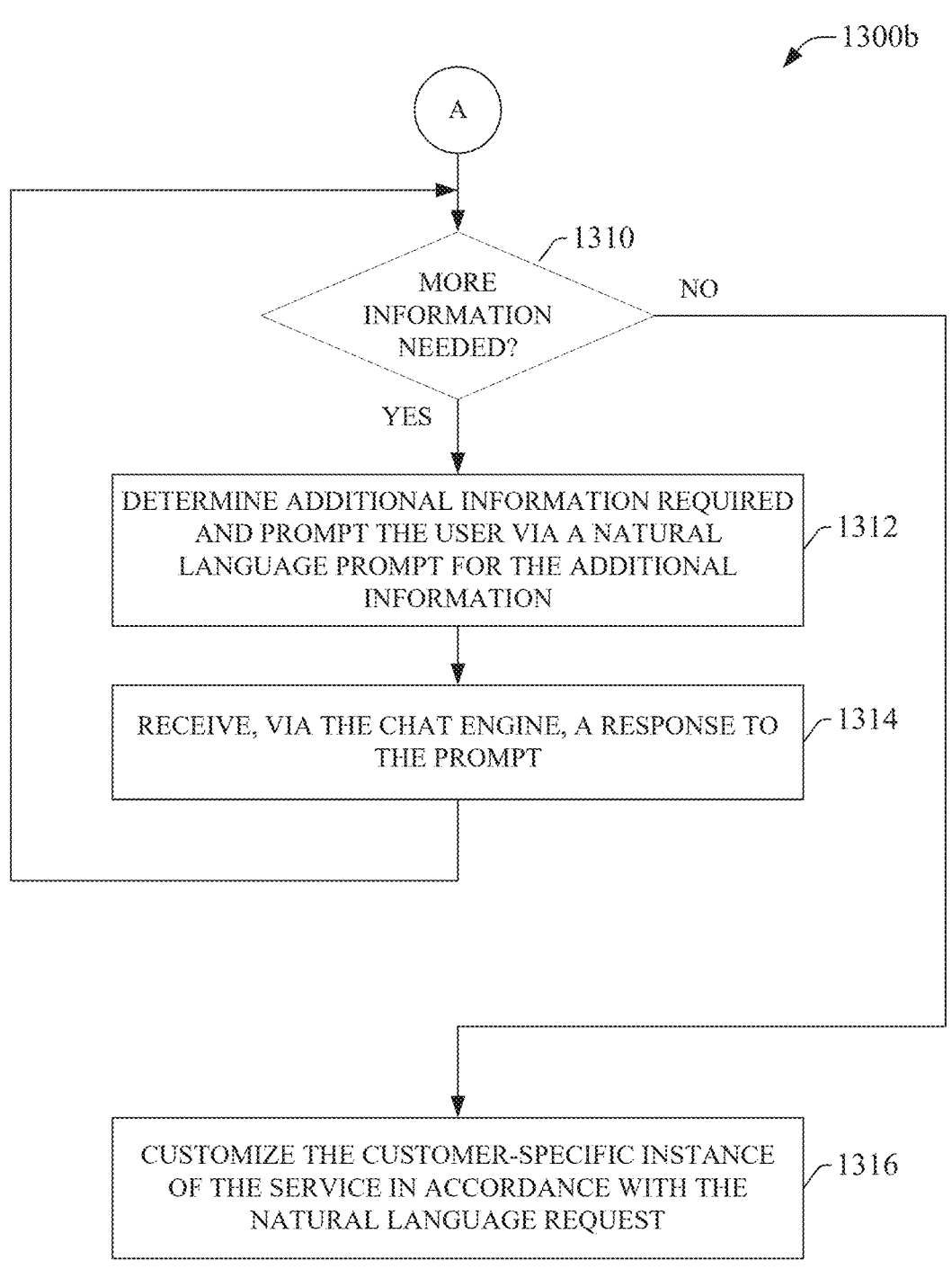
FIG. 13b is a flowchart of a second part of the example methodology for customizing cloud-based manufacturing services using generative AI.

FIG. 12 illustrates an example methodology 1200 for customizing cloud-based manufacturing services for individual industrial customers registered as tenants of a manufacturing cloud system. Initially, at 1202, data from multiple industrial customers is collected and stored by a multi-tenant SaaS manufacturing cloud system (similar to step 1102 of methodology 1100). At 1204, cloud-level industrial data collection, analysis, reporting, and optimization services are executed on the collected data by the SaaS system.

At 1206, a determination is made as to whether service customization input is received at the SaaS system from one of the industrial customers. In this regard, the SaaS system can support the use of extensibility tools that enable customers of the system to define modifications or customizations to their tenant-specific instances of an existing service offered by the SaaS system. The customization input can define, for example, customizations to data collection templates to database tables specifying which items of the customer's data are to be collected, stored, and analyzed; modifications to default dashboards or user interfaces that serve as front ends to the SaaS system's services (e.g., to add, remove, or relocate data items or graphical objects); custom actions to be performed by the SaaS system (including event-driven, time-driven, or screen-driven actions);

custom applications to be executed by the SaaS system on the customer's tenant; or other such customizations.

If customization input is received (YES at step 1206), the methodology proceeds to step 1208, where the SaaS system customizes a customer-specific instance of the service to which the customization input is directed in accordance with the service customization defined by the customization input.

FIG. 13a illustrates a first part of an example methodology 1300a for customizing cloud-based manufacturing services using generative AI. Initially, at 1302, data from multiple industrial customers is collected and stored by a multi-tenant SaaS manufacturing cloud system (similar to step 1202 of methodology 1200). At 1304, cloud-level industrial data collection, analysis, reporting, and optimization services are executed on the collected data by the SaaS system (similar to step 1204 of methodology 1200).

At 1306, a natural language request to customize a customer-specific instance of a service executed by the SaaS system is received via a chat interface associated with the SaaS system. This initial request may be worded at any level of detail or granularity, and may specify such information as an indication of the service to be customized, a description of the requested modification (e.g., an indication of a data item to be added to a data collection template or to a user interface), a description of an event-driven action to be performed by the service and the event that is to trigger the action, or other such information (e.g., descriptions of the specifics of any of the example customization types described above in connection with methodology 1200).

At 1308, the request is analyzed by the SaaS system using a generative AI model to determine if sufficient information can be inferred from the request to ascertain the customer's requirements and implement a customization satisfying the requirements at a sufficiently high level of confidence. The methodology then proceeds to the second part 1300b illustrated in FIG. 13b. At 1310, a determination is made as to whether more information is needed from the customer in order to generate accurate customizations to the indicated service satisfying the user's requirements. If additional information is required (YES at step 1310), the methodology proceeds to step 1312, where the generative AI model is used to determine the additional information required, and to render a natural language prompt designed to guide the user toward providing the additional information. At 1314, a response to the prompt generated at step 1312 is received via the chat engine.

Steps 1310-1314 are repeated as a natural language dialog with the customer until sufficient information translatable to a set of service customizations has been obtained. When no further information is required from the user (NO at step 1310), the methodology proceeds to step 1316, where the customer-specific instance of the service is customized in accordance with the natural language request received at step 1306 and subsequent responses obtained at 1314.

FIG. 14 illustrates an example methodology 1400 for optimizing an industrial customer's manufacturing or business operations based on analysis of multi-tenant by a manufacturing cloud system that executes as an SaaS on a cloud platform. Initially, at 1402, data from multiple industrial customers is collected and stored by a multi-tenant SaaS manufacturing cloud system (similar to step 1102 of methodology 1100). At 1404, a subset of the multi-tenant data collected at 1402 corresponding to a subset of the industrial customers that operate within a common industrial vertical (e.g., automotive, oil and gas, food and drug, textiles, mining, etc.) are grouped for vertical-specific analysis.

At 1406, based on analysis of the subset of the multi-tenant data grouped at step 1404, operating strategies that correlate with substantially optimized performance of a defined business metric (e.g., any of the example business metrics described above in connection with step 1104 of methodology 1100) are determined or learned. The operating strategies can be determined in terms of high-level manufacturing, shipping, inventory, or purchasing strategies within respective different contextual or supply chain conditions.

At 1408, a determination is made as to whether a modification to an industrial customer's production schedule, shipping schedule, inventory schedule, or purchase orders are required in order to align the industrial customer's operations with one or more of the operating strategies determined at step 1406, where the industrial customer is one of the subset of industrial customers operating within the common industrial vertical. At 1410, if a change to one or more of the industrial customer's schedules is required (YES at step 1410), the methodology proceeds to step 1410, where the SaaS system implements the modification to the relevant schedules for the industrial customer (similar to step 1110 of methodology 1100). As in the case of step 1110 of methodology 1100, the SaaS system may also dynamically alter the programming or configurations of industrial assets at the industrial customer's plant facility in accordance with the modification determined at step 1408.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 15:
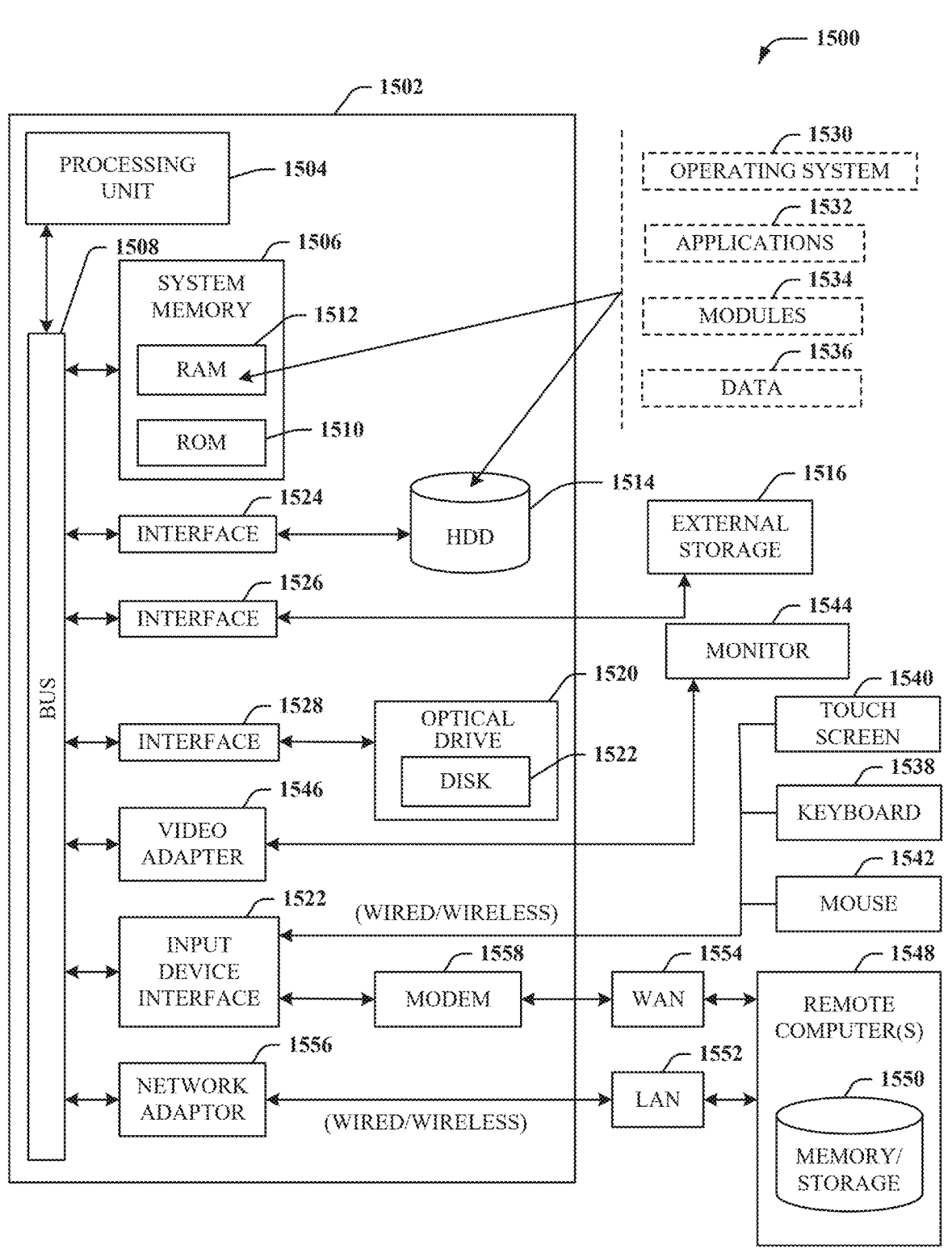
FIG. 15 is an example computing environment.
Figure 16:
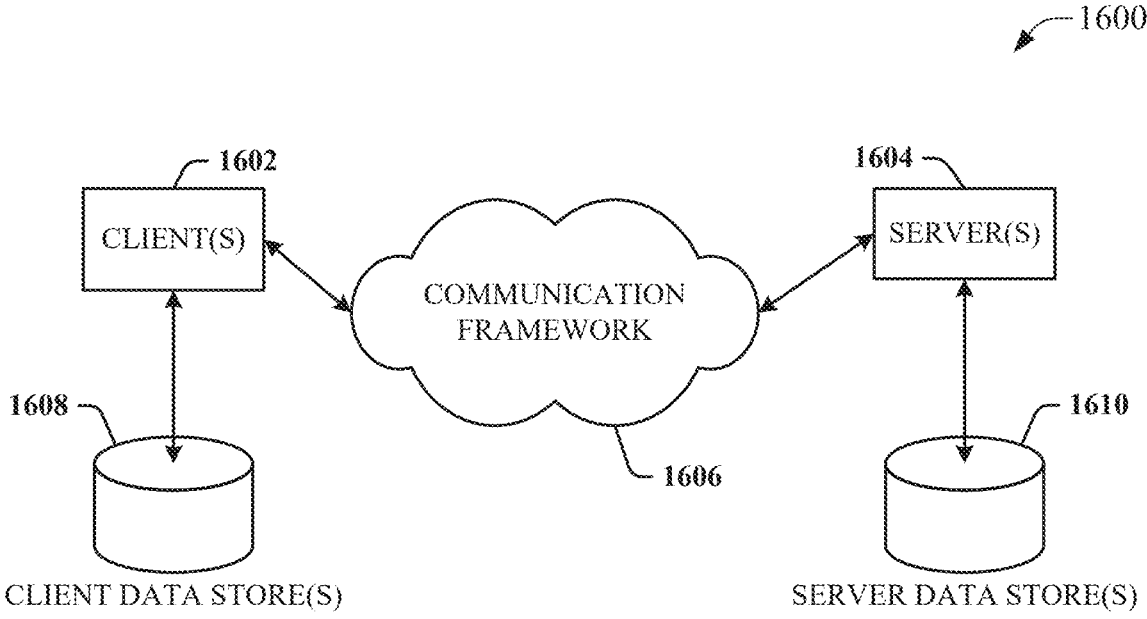
FIG. 16 is an example networking environment.

In order to provide a context for the various aspects of the disclosed subject matter, FIGS. 15 and 16 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for application programs 1532. Runtime environments are consistent execution environments that allow application programs 1532 to run on any operating system that includes the runtime environment. Similarly, operating system 1530 can support containers, and application programs 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1544 or other type of display device can be also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1552 through a wired and/or wireless communication network interface or adapter 1556. The adapter 1556 can facilitate wired or wireless communication to the LAN 1552, which can also include a wireless access point (AP) disposed thereon for communicating with the adapter 1556 in a wireless mode.

When used in a WAN networking environment, the computer 1502 can include a modem 1558 or can be connected to a communications server on the WAN 1554 via other means for establishing communications over the WAN 1554, such as by way of the Internet. The modem 1558, which can be internal or external and a wired or wireless device, can be connected to the system bus 1508 via the input device interface 1522. In a networked environment, program modules depicted relative to the computer 1502 or portions thereof, can be stored in the remote memory/storage device 1550. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1552 or WAN 1554 e.g., by the adapter 1556 or modem 1558, respectively. Upon connecting the computer 1502 to an associated cloud storage system, the external storage interface 1526 can, with the aid of the adapter 1556 and/or modem 1558, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 16 is a schematic block diagram of a sample computing environment 1600 with which the disclosed subject matter can interact. The sample computing environment 1600 includes one or more client(s) 1602. The client(s) 1602 can be hardware and/or software (e.g., threads, processes, computing devices). The sample computing environment 1600 also includes one or more server(s) 1604. The server(s) 1604 can also be hardware and/or software (e.g., threads, processes, computing devices). The servers 1604 can house threads to perform transformations by employing one or more embodiments as described herein, for example. One possible communication between a client 1602 and servers 1604 can be in the form of a data packet adapted to be transmitted between two or more computer processes. The sample computing environment 1600 includes a communication framework 1606 that can be employed to facilitate communications between the client(s) 1602 and the server(s) 1604. The client(s) 1602 are operably connected to one or more client data store(s) 1608 that can be employed to store information local to the client(s) 1602. Similarly, the server (s) 1604 are operably connected to one or more server data store(s) 1610 that can be employed to store information local to the servers 1604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
   a memory that stores executable components; and
   a processor, operatively coupled to the memory, that executes the executable components, the executable components comprising:
   internal services that implement a manufacturing cloud system, wherein the manufacturing cloud system is a multi-tenant Software-as-a-Service (SaaS) system that executes predefined data collection and analytics services that are accessible to industrial customer entities registered to use the manufacturing cloud system;
   a user interface component configured to render a chat interface configured to receive, from an industrial customer entity of the industrial customer entities, a natural language input describing a customization to an instance of the data collection and analytics services specific to the industrial customer entity;
   a generative artificial intelligence (AI) component configured to:
   in response to determining, based on analysis of the natural language input, that additional information will yield a customization to the instance of the data collection and analytics services having a probability of satisfying the natural language input that exceeds a threshold, formulate a first natural language response that prompts for the additional information and render the first natural language response via the chat interface, and
   in response to receipt, via the chat interface, of a natural language answer containing the additional information, infer the customization based on the analysis of the natural language input and the additional information contained in the natural language answer; and
   a customization component configured to reconfigure the instance to implement the customization.

2. The system of claim 1, wherein the generative artificial intelligence (AI) component is configured to infer the customization further based on multi-tenant data collected by the system from the industrial customer entities.

3. The system of claim 1, wherein the generative AI component is further configured to, in response to receipt of the natural language input, formulate a prompt, directed to a generative AI model, designed to obtain a response from the generative AI model comprising information used by the customization component to formulate the customization.

4. The system of claim 3, wherein the generative AI component is configured to formulate the prompt based on the analysis of the natural language input and training data encoded in one or more trained models.

5. The system of claim 4, wherein the training data comprises at least one of technical specifications of industrial assets, monitored trends in operation of the industrial assets, information about supply chains in which the industrial customer entities participate, plant schedules, help files, information from knowledgebases of industrial asset vendors, training materials, information defining industrial standards, or design standards for respective types of industrial control applications.

6. The system of claim 3, wherein the response from the generative AI model comprises at least one of information about data items available for collection on an industrial asset or information about reporting or auditing requirements for an industrial vertical in which the industrial customer entity operates.

7. The system of claim 1, wherein the customization comprises at least one of a modification to a data collection template that defines data items to be collected from industrial assets owned by the industrial customer entity, a modification to a data table in which data collected from the industrial assets are stored, creation of a custom data field on a predefined user interface generated by the internal services, a modification to an application programming interface (API) of the manufacturing cloud system, definition of a custom schema, addition of a control to the predefined user interface, removal of a control from the predefined user interface, relocation of the control on the predefined user interface, or a custom action to be performed by the instance of the data collection and analytics services in response to an event defined by the natural language input.

8. The system of claim 1, wherein the internal services render the instance of the data collection and analytics service as reconfigured by the customization component exclusively accessible to the industrial customer entity while rendering the predefined data collection and analytics services accessible to other industrial customer entities of the industrial customer entities.

9. The system of claim 1, wherein the data collection and analytics services comprise at least one of an industrial manufacturing execution system (MES), an enterprise resource planning (ERP) system, quality management system, a supply chain management and planning system, or a customer relationship management (CRM) system.

10. A method, comprising:

implementing, by a manufacturing cloud system comprising a processor, a multi-tenant Software-as-a-Service (SaaS) system that executes predefined data collection and analytics services that are accessible to industrial customer entities registered to use the manufacturing cloud system;

receiving, by the manufacturing cloud system via a chat interface rendered on a client device associated with an industrial customer entity of the industrial customer entities, a natural language input describing a customization to an instance of the data collection and analytics services specific to the industrial customer entity;

in response to determining, based on analysis of the natural language input, that additional information will yield a customization to the instance of the data collection and analytics services having a probability of satisfying the natural language input that exceeds a threshold:

formulating a first natural language response that prompts for the additional information, and rendering the first natural language response via the chat interface;

in response to receiving, via the chat interface, a natural language answer containing the additional information, inferring, by the manufacturing cloud system, the customization based on generative artificial intelligence (AI) analysis of the natural language input and the additional information contained in the natural language answer; and modifying, by the manufacturing cloud system, the instance to implement the customization.

11. The method of claim 10, wherein the inferring comprises inferring the customization further based on multitenant data collected by the system from the industrial customer entities.

12. The method of claim 10, wherein the inferring comprises:

in response to receipt of the natural language input, formulating, by the manufacturing cloud system, a prompt directed to a generative AI model, wherein the prompt is designed to obtain a response from the generative AI model comprising information used by the system to infer the customization and perform the modifying of the instance.

13. The method of claim 12, wherein the formulating of the prompt comprises formulating the prompt based on the analysis of the natural language input and training data encoded in one or more trained models.

14. The method of claim 13, wherein the training data comprises at least one of technical specifications of industrial assets, monitored trends in operation of the industrial assets, information about supply chains in which the industrial customer entities participate, plant schedules, help files, information from knowledgebases of industrial asset vendors, training materials, information defining industrial standards, or design standards for respective types of industrial control applications.

15. The method of claim 12, wherein the response from the generative AI model comprises at least one of information about data items available for collection on an industrial asset or information about reporting or auditing requirements for an industrial vertical in which the industrial customer entity operates.

16. The method of claim 10, wherein the customization comprises at least one of a modification to a data collection template that defines data items to be collected from industrial assets owned by the industrial customer entity, a modification to a data table in which data collected from the industrial assets are stored, creation of a custom data field on a predefined user interface generated by the internal services, a modification to an application programming interface (API) of the manufacturing cloud system, definition of a custom schema, addition of a control to the predefined user interface, removal of a control from the predefined user interface, relocation of the control on the predefined user interface, or a custom action to be performed by the instance of the data collection and analytics services in response to an event defined by the natural language input.

17. A non-transitory computer-readable medium having stored thereon instructions that, in response to execution, cause a system comprising a processor to perform operations, the operations comprising:

executing a manufacturing cloud system on a cloud platform, wherein the manufacturing cloud system is a multi-tenant Software-as-a-Service (SaaS) system that executes predefined data collection and analytics services that are accessible to industrial customer entities registered to use the manufacturing cloud system;

receiving, via a chat interface rendered on a client device associated with an industrial customer entity of the industrial customer entities, a natural language input describing a customization to an instance of the data collection and analytics services specific to the industrial customer entity;

in response to determining, based on analysis of the natural language input, that additional information will yield a customization to the instance of the data collection and analytics services having a probability of satisfying the natural language input that exceeds a threshold:

generating a first natural language response that prompts for the additional information, and rendering the first natural language response via the chat interface;

in response to receiving, via the chat interface, a natural language answer containing the additional information, inferring the customization based on generative artificial intelligence (AI) analysis of the natural language input; and modifying the instance to implement the customization.

18. The non-transitory computer-readable medium of claim 17, wherein the inferring comprises:

in response to receipt of the natural language input, formulating, by the system, a prompt directed to a generative AI model, wherein the prompt is designed to obtain a response from the generative AI model comprising information used by the system to infer the customization and perform the modifying of the instance.

19. The non-transitory computer-readable medium of claim 18, wherein the formulating of the prompt comprises formulating the prompt based on the analysis of the natural language input and training data encoded in one or more trained models.

20. The non-transitory computer-readable medium of claim 17, wherein the customization comprises at least one of a modification to a data collection template that defines data items to be collected from industrial assets owned by the industrial customer entity, a modification to a data table in which data collected from the industrial assets are stored, creation of a custom data field on a predefined user interface generated by the internal services, a modification to an application programming interface (API) of the manufacturing cloud system, definition of a custom schema, addition of a control to the predefined user interface, removal of a control from the predefined user interface, relocation of the control on the predefined user interface, or a custom action to be performed by the instance of the data collection and analytics services in response to an event defined by the natural language input.

\*   \*   \*   \*   \*